(12) United States Patent
Harano et al.

(10) Patent No.: US 7,513,697 B2
(45) Date of Patent: Apr. 7, 2009

(54) PHOTOELECTRIC TRANSFORMING CONNECTOR FOR OPTICAL FIBERS

(75) Inventors: Tomokazu Harano, Tsu (JP); Mitsuru Iida, Yokohama (JP); Kenichi Shimaya, Hirakata (JP); Yoshiaki Kambe, Nara (JP)

(73) Assignee: Panasonic Electric Works Co., Ltd, Osaka (JP)

( * ) Notice: Subject to any disclaimer, the term of this patent is extended or adjusted under 35 U.S.C. 154(b) by 310 days.

(21) Appl. No.: 10/583,772

(22) PCT Filed: Aug. 4, 2005

(86) PCT No.: PCT/JP2005/014282

§ 371 (c)(1),
(2), (4) Date: Jun. 21, 2006

(87) PCT Pub. No.: WO2006/080105

PCT Pub. Date: Aug. 3, 2006

(65) Prior Publication Data

US 2008/0205826 A1 Aug. 28, 2008

(30) Foreign Application Priority Data

Jan. 31, 2005 (JP) ............................. 2005-022818

(51) Int. Cl.
*G02B 6/36* (2006.01)
(52) U.S. Cl. .......................................... 385/88; 385/89
(58) Field of Classification Search .............. 385/88–94
See application file for complete search history.

(56) References Cited

U.S. PATENT DOCUMENTS 6,741,776 B2 * 5/2004 Iwashita et al. ............... 385/49

7,404,680 B2 * 7/2008 Ono et al. ..................... 385/88

FOREIGN PATENT DOCUMENTS

| JP | 11-214100 | 8/1999 |
| JP | 11-329637 | 11/1999 |
| JP | 2002-267892 | 9/2002 |

(Continued)

OTHER PUBLICATIONS

English language Abstract of Korea 10-2004-0110660.

(Continued)

*Primary Examiner*—Sarah Song
(74) *Attorney, Agent, or Firm*—Greenblum & Bernstein, P.L.C.

(57) ABSTRACT

A photoelectric transforming connector for optical fibers capable of application to a compact mobile apparatus such as a mobile phone comprises: a plug having a first light emitting portion for transmitting a light signal and/or a first light receiving portion for receiving a light signal through an optical fiber; an MID having a second light receiving portion facing the first light emitting portion and transforming the light signal from the first light emitting portion to an electric signal and/or a second light emitting portion facing the first light receiving portion and transforming an electric signal to a light signal and transmitting it to the first light receiving portion; and a shell to which the plug and the MID are attached. The shell has a bottom plate to which the plug and the MID are attached in a manner so that the first light emitting portion faces the second light receiving portion and/or the first light receiving portion faces the second light emitting portion, and a plurality of elastic pieces provided for standing up toward top face side from four side of the bottom plate and contacting the plug and the MID. Thereby, the plug can be attached to and detached from the bottom plate of the shell in a vertical direction.

14 Claims, 21 Drawing Sheets

FOREIGN PATENT DOCUMENTS

| | | |
|---|---|---|
| JP | 2003-114364 | 4/2003 |
| JP | 2004-012624 | 1/2004 |
| JP | 2005-025127 | 7/2005 |
| JP | 2005-202229 | 7/2005 |
| KR | 10-2004 0110660 | 12/2004 |

OTHER PUBLICATIONS

English language Abstract of JP 2004-012624.
English language Abstract of JP 2005-202229.
English language Abstract of JP 2003-114364.
English language Abstract of JP 2005-025127.
English language Abstract of JP 2002-267892.
English language Abstract of JP 11-214100.
English language Abstract of JP 11-329637.
U.S. Appl. No. 10/597,637 to Harano et al., which was filed on Aug. 2, 2006.

* cited by examiner

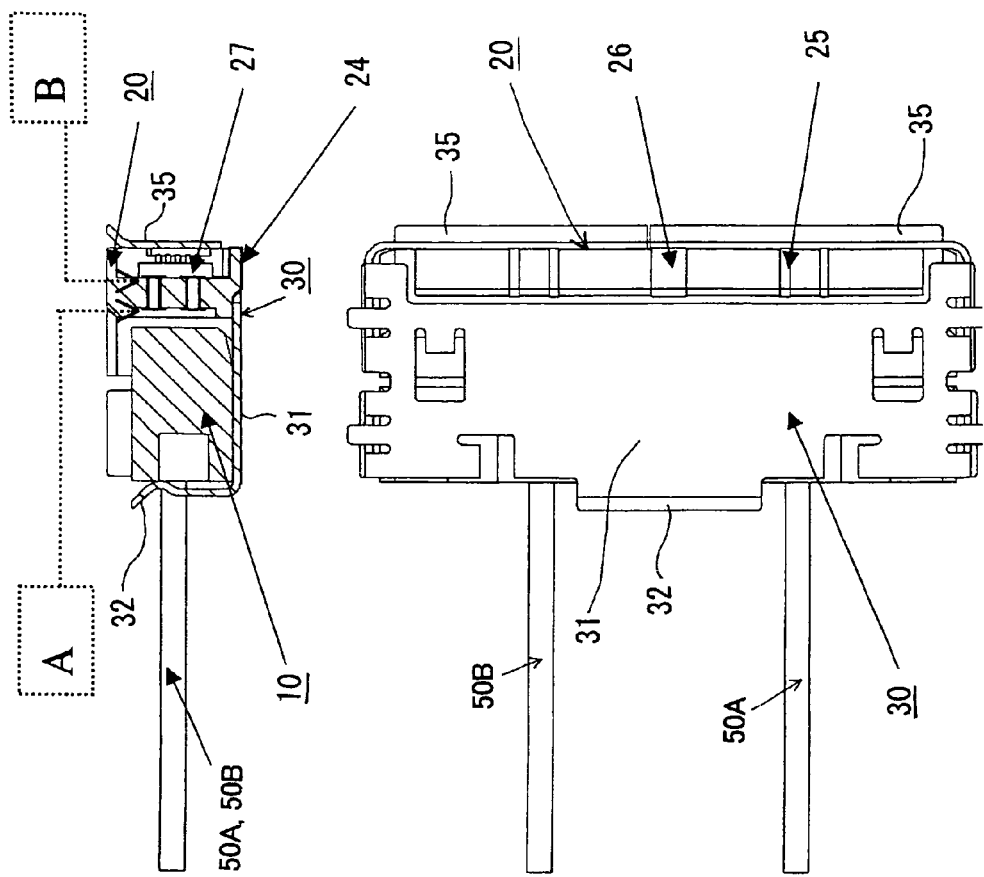

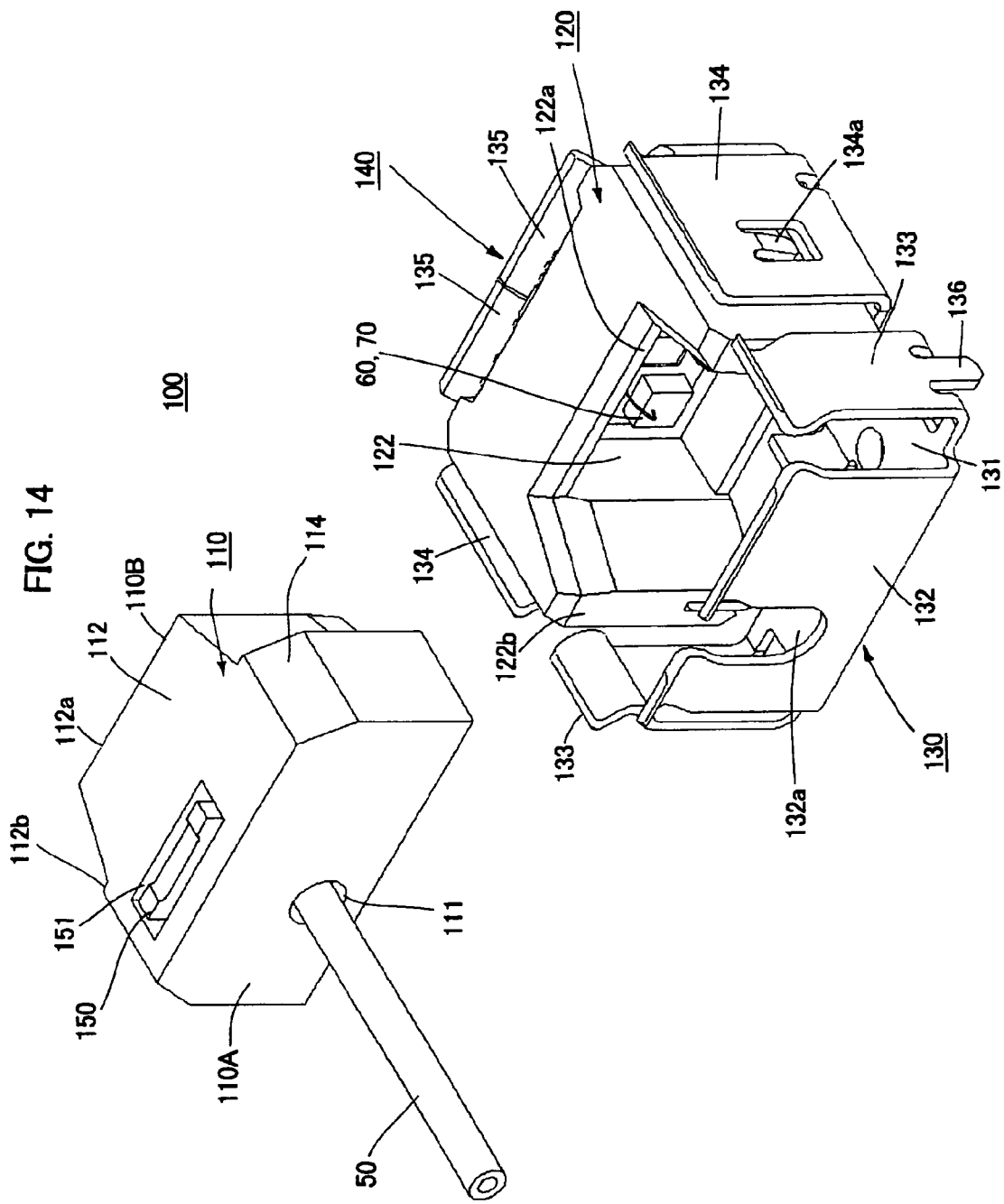

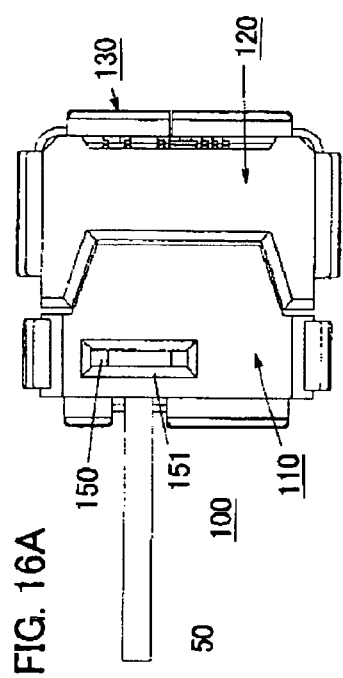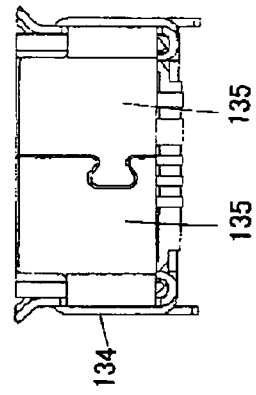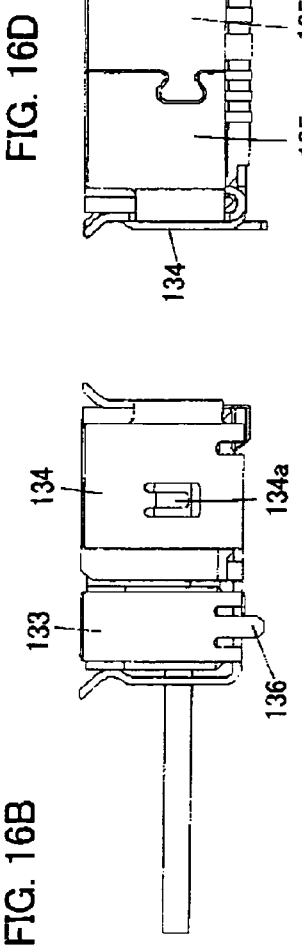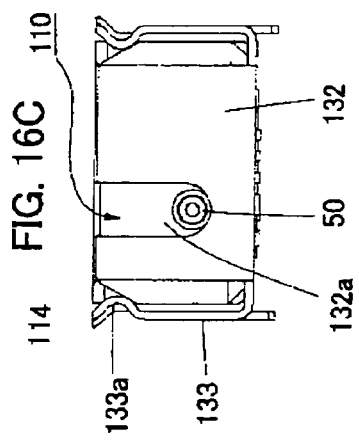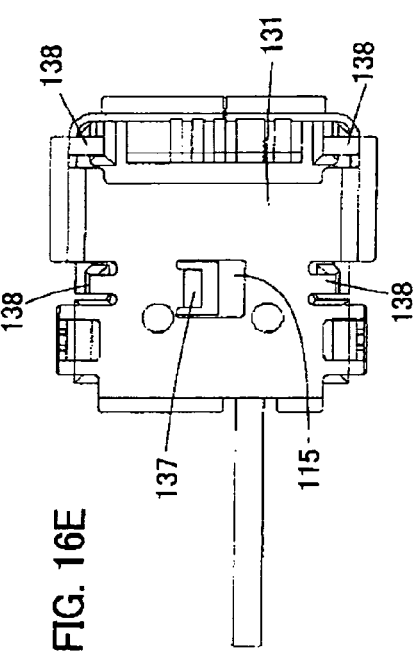

PHOTOELECTRIC TRANSFORMING CONNECTOR FOR OPTICAL FIBERS

TECHNICAL FIELD

The present invention relates to a photoelectric transforming connector for optical fibers that transforms a light signal to an electric signal or an electric signal to a light signal.

BACKGROUND ART

In such a photoelectric transforming connector, as described in, for example, Japanese Laid-Open Patent Publication No. 11-214100, a plug is generally connected to a socket in frontally direction when the socket and the plug constituting a connector is coupled (lateral connection).

According to such a method for connecting the plug to the socket in frontally direction, optical axes of the socket and the plug can be performed precisely. However, when it is assumed that the photoelectric transforming connector is disposed inside a compact electronic apparatus such as a mobile phone or an electronic personal organizer, connection work of the socket and the plug becomes extremely difficult because various electronic members are mounted on a circuit board to which the socket is implemented. Alternatively, when an enough space enabling the connection work of the socket and the plug easily is ensured, the circuit board is upsized. Thus, it is virtually impossible to apply the photoelectric transforming connector in the miniaturized mobile equipment.

On the other hand, as described in, for example, in Japanese Laid-Open Patent Publication No. 11-329637, in order to connect circuit boards each other, a structure for connecting a connector mounted on a circuit board to another connecter mounted on another circuit board from above is also known. However, when such a connection structure of connectors is used in the compact electronic equipment such as the mobile phone or the electronic personal organizer, there is a problem that a height (or a thickness) of the compact electronic equipment becomes larger.

DISCLOSURE OF INVENTION

An object of the present invention is aimed to enable the downsizing and the improvement of connection workability of the photoelectric transforming connector for optical fibers.

A photoelectric transforming connector for optical fibers in accordance with an aspect of the present invention comprises: a first connection subject to which an optical fiber is connected and having a first light emitting portion transmitting a light signal and/or a first light receiving portion receiving a light signal through the optical fiber; a second connection subject having a second light receiving portion facing the first light emitting portion and converting a light signal to an electric signal and/or a second light emitting portion facing the first light receiving portion, transforming an electric signal to a light signal and transmitting it to the first light receiving portion; and a shell to which the first connection subject and the second connection subject are attached; and characterized by that the shell has a bottom plate to which the first connection subject and the second connection subject are attached in a manner so that the first light emitting portion faces the second light receiving portion and/or the first light receiving portion faces the second light emitting portion, and a plurality of elastic pieces provided to stand upward from four sides of the bottom plate and contacting with the first connection subject and the second contacting subject.

According to such a constitution, under a state that the second connection subject (equivalent to a socket) is attached to the shell, the first connection subject (equivalent to a plug) and the second connection subject can be aligned contiguously by attaching the first connection subject in a direction perpendicular to the bottom plate of the shell. Therefore, works for attaching and detaching the first connection subject becomes easier, and this photoelectric transforming connector can be incorporated in an electronic apparatus without upsizing the height of the electronic apparatus. In addition, when this photoelectric transforming connector is implemented on a circuit board, the first connection subject can be attached to and detached from the bottom plate of the shell in a direction perpendicular thereto, so that a possibility to interfere with other electronic components on the circuit board becomes very few. Thus, a space for enabling attaching and detaching works of the first connection subject easier can be miniaturized, so that upsizing of the circuit board can be prevented. As a result, the photoelectric transforming connector can be applied to the miniaturized mobile apparatus.

BRIEF DESCRIPTION OF DRAWINGS

FIGS. 12A and 12B are side sectional view and bottom view respectively showing wiring patterns on a rear face of the MID in the first embodiment.

FIG. 14 is a perspective view showing a state before connecting the plug to the MID which constitute the photoelectric transforming connector for optical fibers in accordance with a second embodiment of the present invention.

FIGS. 16A to 16E are a plain view, a side view, a front view, a rear view and a bottom view respectively showing the photoelectric transforming connector after connecting the plug with the MID in the second embodiment.

BEST MODE FOR CARRYING OUT THE INVENTION

First Embodiment

Figure 1:
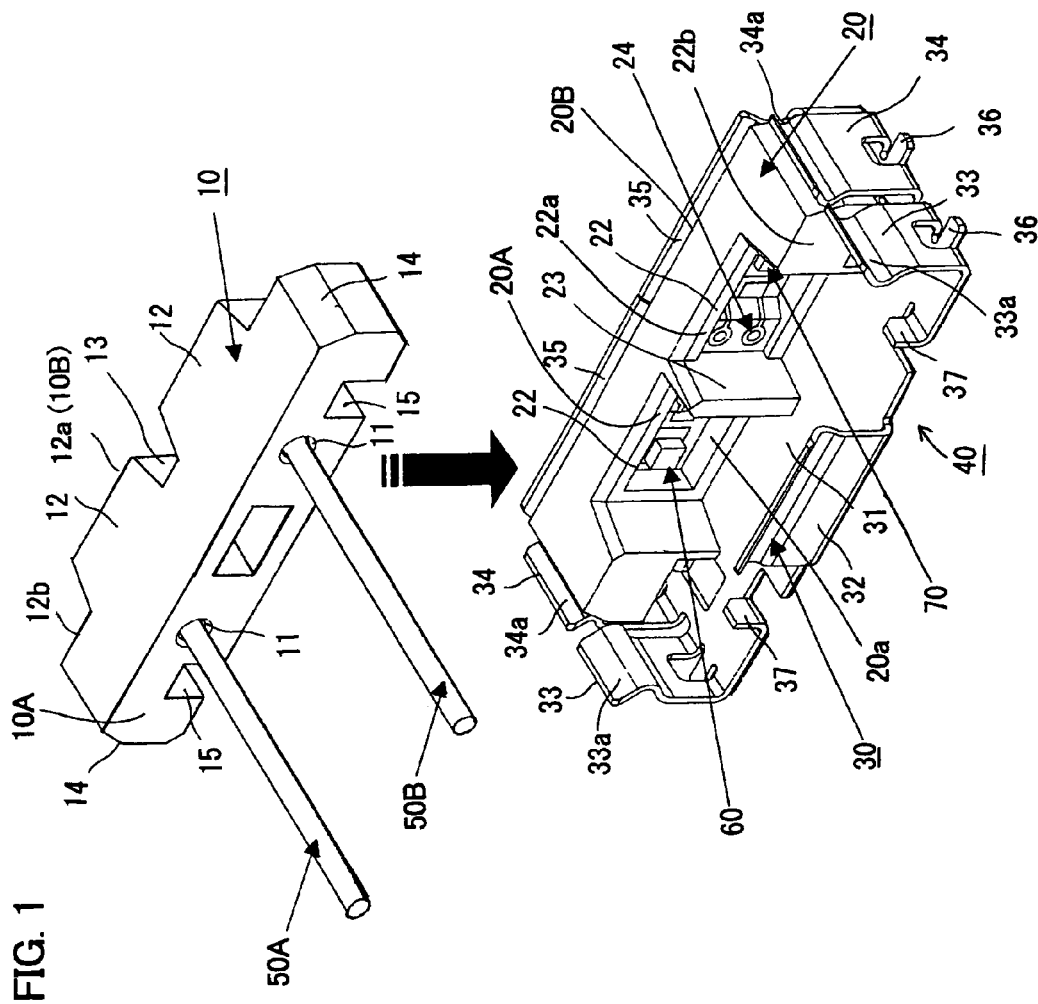
FIG. 1 is perspective view showing a state before connecting a plug with an MID which constitute a photoelectric transforming connector for optical fibers in accordance with a first embodiment of the present invention.
Figure 2:
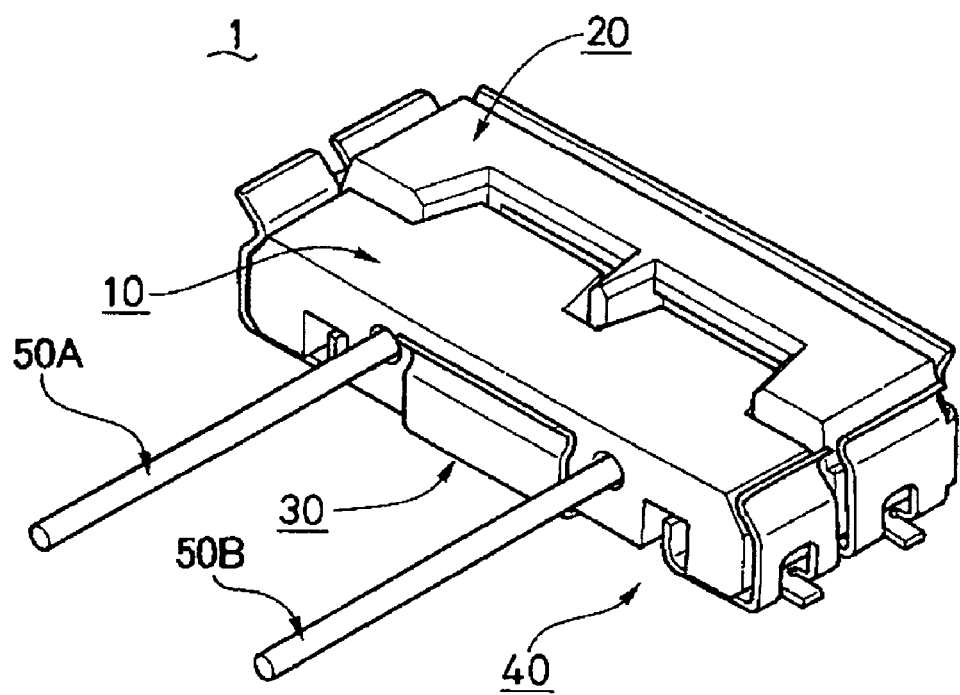
FIG. 2 is a perspective view showing a state after connecting the plug with the MID in the first embodiment.
Figure 3:
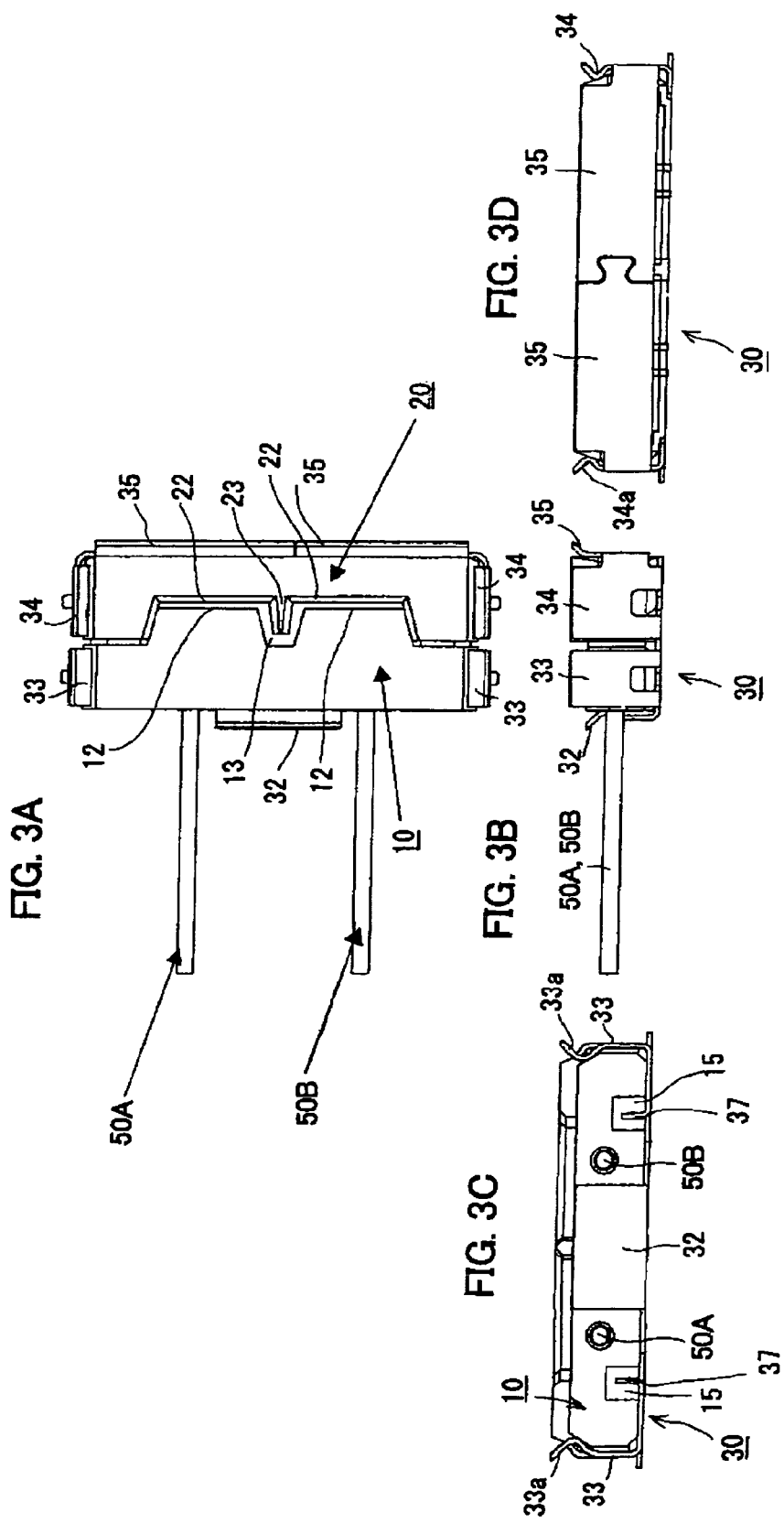
FIGS. 3A to 3D are respectively a plain view, a side view, a front view and a rear view of the photoelectric transforming connector after connecting the plug with the MID in the first embodiment.
Figure 4:
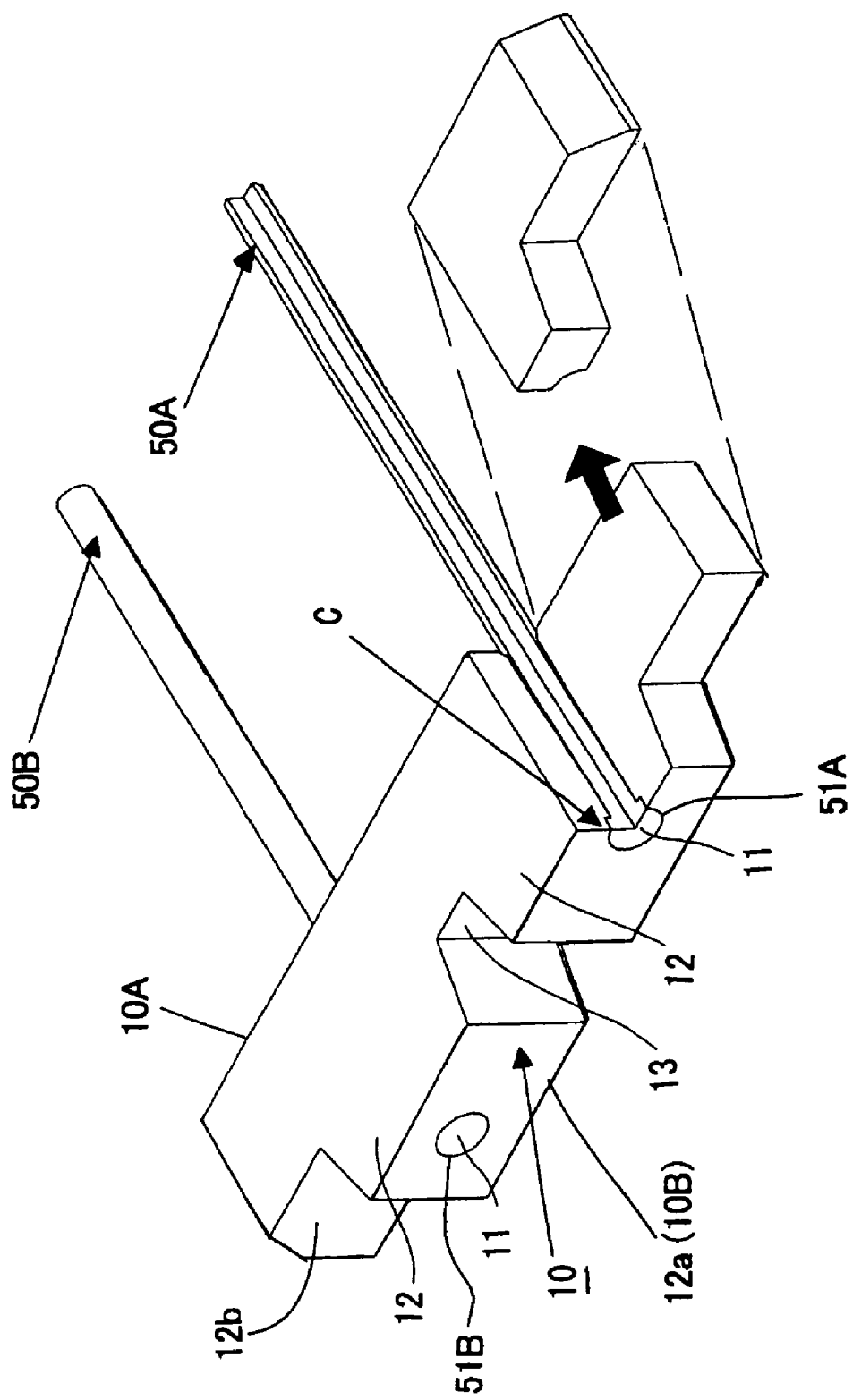
FIG. 4 is a perspective view showing a state to fix optical fibers on the plug in the first embodiment.
Figure 5:
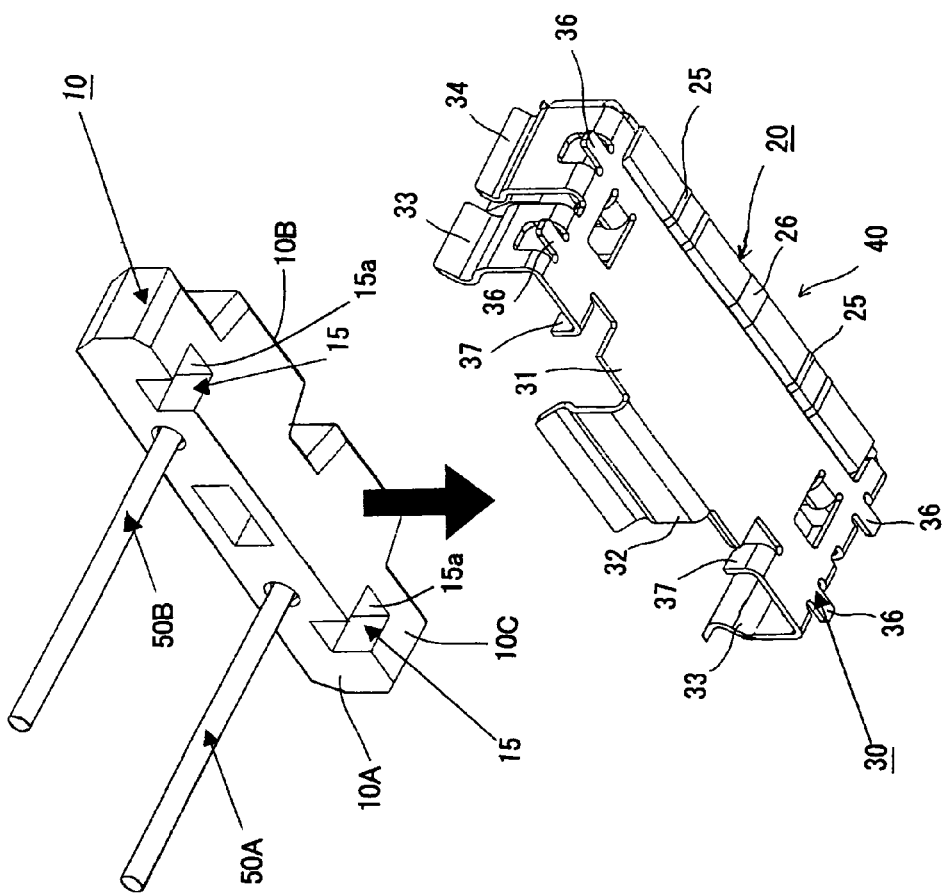
FIG. 5 is a perspective view of the photoelectric transforming connector in a state before connecting the plug with the MID which is observed from a bottom face side similar to FIG. 1.

A photoelectric transforming connector for optical fibers in accordance with a first embodiment of the present invention is described with reference to drawings. FIG. 1 shows a state before connecting a plug 10 (first connection subject) with an MID (Molded Interconnect Device) 20 (second connection subject) comprising a three dimensional circuit board, which constitute the photoelectric transforming connector 1 in accordance with the first embodiment. FIG. 2 and FIGS. 3A to 3D show the photoelectric transforming connector 1 after connecting the plug 10 with the MID 20. FIG. 4 shows a state to fix optical fibers in the MID. FIG. 5 is a view of the photoelectric transforming connector 1 in the same state as that in FIG. 1 observed from a bottom face side. FIGS. 9 to 12 respectively show a structure of each portion of the photoelectric transforming connector 1.

The photoelectric transforming connector 1 comprises the plug 10 to which optical fibers are connected, the MID 20 to which the plug 10 is fitted and connected, and a shell 30 made of a metal to which the plug 10 and the MID 20 are attached. A receptacle 40 equivalent to a socket is formed with fixing the MID 20 on the shell 30.

The plug 10 is formed of a conductive plastic material, and two optical fibers 50A and 50B are connected thereto for transmitting and receiving light signal. For example, a light signal transmitted from another photoelectric transforming connector passes through the optical fiber 50A disposed in left side and a light signal transmitted from this photoelectric transforming connector 1 passes through the optical fiber 50B disposed in right side in FIG. 1. The optical fibers 50A and 50B are formed of a plastic material for having flexibility, inserted into optical fiber insertion holes 11 of the plug 10 and front ends of the optical fibers 50A and 50B shown by arrow C are heat welded on the plug 10, as shown in FIG. 4. An end face of the optical fiber 50A in FIG. 4 is defined as a first light emitting portion 51A, and an end face of the optical fiber 50B is defined as a first light receiving portion 51B. In addition, a side of the plug 10 through which the optical fibers 50A and 50B are inserted is defined as a front face 10A and an end side to which the optical fibers 50A and 50B are heat welded (side of the first light emitting portion 51A and the first light receiving portion 51B) is defined as a rear face 10B.

The MID 20 is a product that circuitry patterns are formed on surfaces of resin molded subject, and a light receiving device 60 and a light emitting device 70 are further implemented on the circuitry pattern. As shown in FIG. 1, the light receiving device 60 is provided at a position facing the first light emitting portion 51A on the MID 20 in a state that the plug 10 is connected with the MID 20.

In addition, the light emitting device 70 is provided at a position facing the first light receiving portion 5B on the MID 20. The light receiving device 60 serves as a second light receiving portion for transforming a light signal from the first light emitting portion 51A to an electric signal. The light emitting device 70 serves as a second light emitting portion for transforming an electric signal to a light signal and transmits it to the first light receiving portion 51B. A circuitry pattern 24 through which the signals are transmitted is further provided on the MID 20.

The shell 30 has a bottom plate 31 on which the plug 10 and the MID 20 are placed under a state that the first light emitting portion 51A faces the light receiving device 60 (second light receiving portion) and the first light receiving portion 51B faces the light emitting device 70 (second light emitting portion), and elastic pieces 32, 33, 34 and 35 which are formed to stand upward from four sides of the bottom plate 31, and contacted with or engaged with side faces of the plug 10 and the MID 20. The elastic piece 35 is provided to be contacted with or engaged with a face opposite to the face on which the light receiving device 60 and the light emitting device 70 are implemented among the side faces of the MID. In addition, the shell 30 will be disposed on a circuit board not shown in the figure.

In case that the conductive plastic material is used as a material for molding the plug 10 as mentioned above, the plug 10 can be connected to a GND of the circuit board not shown through the shell 30, so that the plug 10 itself can be used as a part of shielding.

In order to connect the plug 10 with the MID 20, as shown in FIG. 1, the plug 10 is attached to a receptacle 40, which is constituted by fixing the MID 20 on the shell 30, from top face of the receptacle 40 (longitudinal connection). With such a constitution, the plug 10 and the MID 20 can be arranged laterally while the plug 10 is attached in a direction perpendicular to the circuit board on which the receptacle 40 is implemented. Thus, when this connector 1 is used for connecting the circuit boards each other, a height of an electronic apparatus can be lowered. In addition, while the plug 10 is attached to or detached from the receptacle 40, the plug 10 is moved perpendicular to the circuit board on which the receptacle 40 is implemented, so that not only interference between the plug 10 and other electronic components implemented on the circuit board can be prevented, but also the work for attaching or detaching the plug 10 to or from the receptacle 40 becomes easier. Thus, the circuit board can be downsized with increasing packaging density of the circuit board. As a result, the photoelectric transforming connector can be used for a compact electronic apparatus such as a mobile phone or a personal organizer as for the connection structure.

Two pairs of elastic pieces 33 and 34 are individually formed respectively corresponding to the plug 10 and the MID 20 on two parallel sides in an opposing direction of the plug 10 and the MID 20 among four sides of the bottom plate 31 of the shell 30. In other words, when the plug 10 is attached to or detached from the receptacle 40, the elastic pieces 33 corresponding to the plug 10 are deformed, but the elastic pieces 34 corresponding to the MID 20 are not deformed. Thus, when plug 10 is attached to or detached from the receptacle 40 in a state that the MID 20 is attached to the shell 30, the MID 20 hardly moves, so that the attaching or detaching work of the plug 10 becomes easier.

Figure 6:
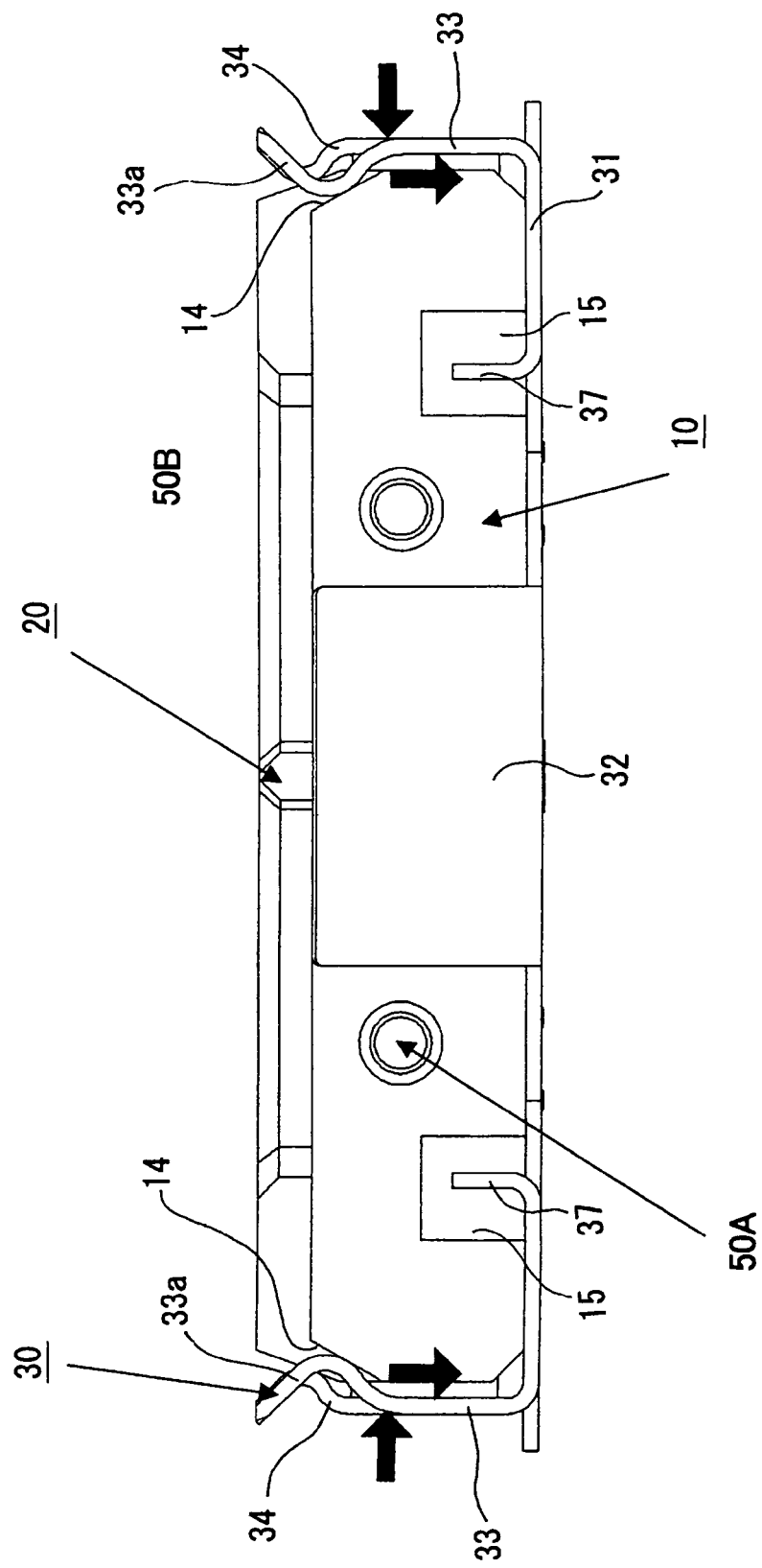
FIG. 6 is a front view showing a state for aligning the plug and the MID in vertical direction in the first embodiment.

A hooking portion 33a, which is inwardly bent, is formed in a vicinity of a front end of each elastic piece 33. As shown in FIG. 6, the hooking portion 33a contacts with a slanted face 14 formed on the side face of the plug 10, so that it presses the plug 10 in a direction toward the bottom plate 31 of the shell 30. Thus, it is prevented that the plug 10 comes out to a top face side of the receptacle 40, and alignment of optical axes of the plug 10 and the MID 20 in heightwise direction of the receptacle 40 is performed. Similarly, a hooking portion 34a, which is inwardly bent, is formed in a vicinity of a front end of each elastic piece 34. The hooking portion 34a contacts with a slanted face formed on the side face of the MID 20, so that it presses the MID 20 in a direction toward the bottom plate 31.

Figure 7:
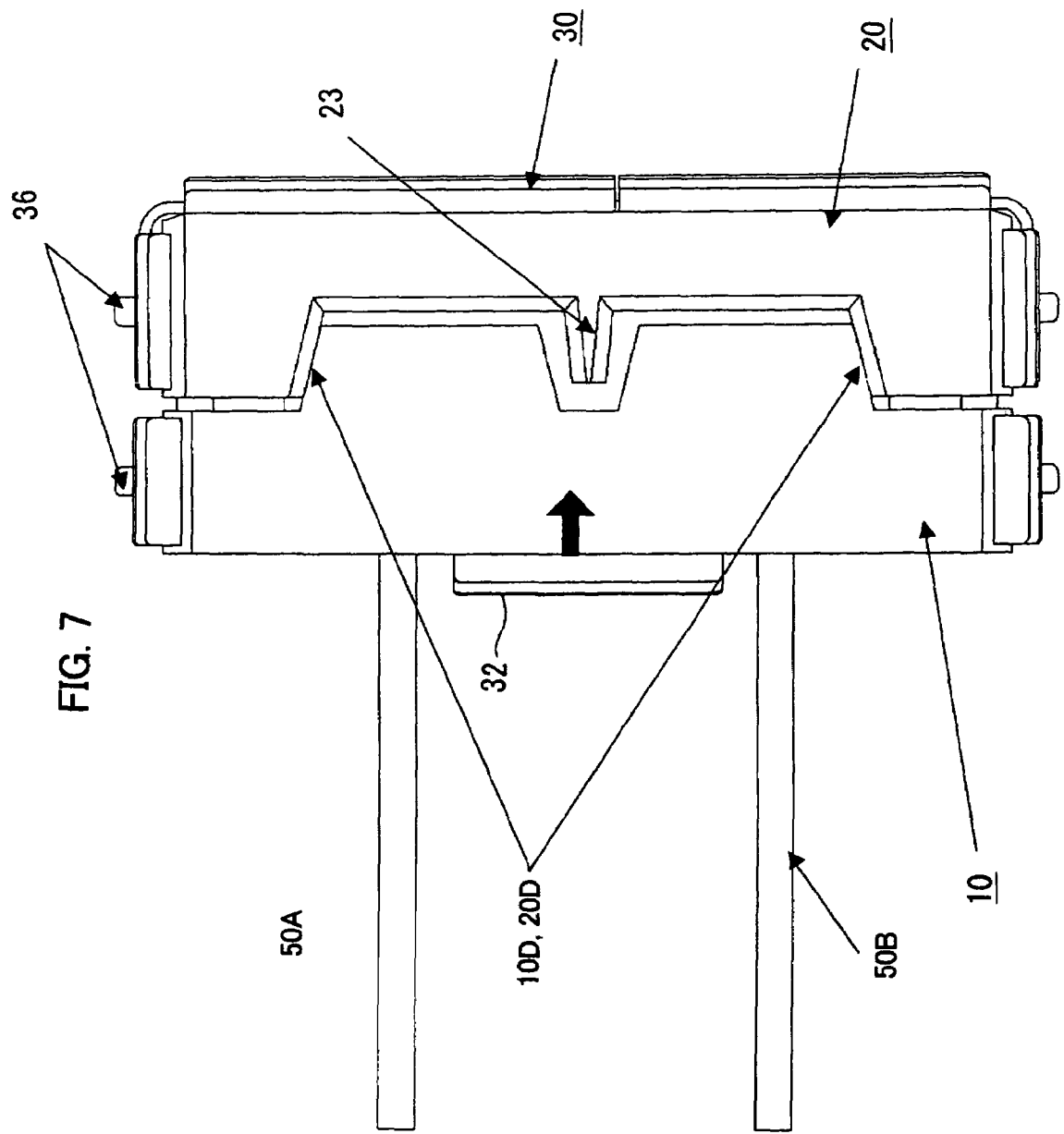
FIG. 7 is a plan view showing a state for aligning the plug and a tapered portion of the MID in the first embodiment.

Convex engaging portions 12 are formed on a face of the plug 10 facing the MID 20, and concave engaging portions 22 are formed on a face of the MID 20 facing the plug 10. In a state that the plug 10 and the MID 20 are connected, a front end 12a and a base end 12b of each convex engaging portion 12 of the plug 10 respectively face but do not contact with a base end 22a and a front end 22b of each concave engaging portion of the MID 20, and tapered faces 10D between the front end 12a and the base end 12b of the convex engaging portion 12 and tapered faces 20D between the base end 22a and the front end 22b of the concave engaging portion 22 are contacted, so that the alignment of the plug 10 and the MID 20 is performed. FIG. 7 shows the alignment through the tapered faces 10D of the plug 10 and the tapered faces 20D of the MID 20. Thereby, it is possible easily to confirm that the convex engaging portions 12 of the plug 10 contact the concave engaging portions 22 of the MID 20. Furthermore, it is possible easily to perform the alignment of the optical axes in an opposing direction of the plug 10 and the MID 20 and a direction perpendicular thereto, that is, a longitudinal direction and a widthwise direction of the receptacle 40. Furthermore, an advantageous merit, that the optical axes of the plug 10 and the MID 20 are rarely out of alignment, is obtained.

A partition wall 23, which protrudes toward the convex engaging portions 12 of the plug 10, is formed between the light receiving device 60 and the light emitting device 70 in the concave engaging portions 22 of the MID 20. Furthermore, a notch 13 corresponding to the partition wall 23 is formed between the convex engaging portions 12 of the plug 10. The partition wall 23 serves as a light shielding plate so as to prevent leakage of the light emitted from the light emitting device 70 to a side of the light receiving device 60.

As shown in FIG. 5, a pair of first engaging pieces 37 which protrudes toward top face side from the bottom plate 31 is provided on the shell 30 so as to prevent that the plug 10 leaves more than necessary from the MID 20 when the optical fibers 50A and 50B are pulled. Each first engaging piece 37 is formed by cutting the bottom plate 31 in substantially L-shape in the opposing direction of the plug 10 and the MID 20 and the direction perpendicular thereto and by bending the portion along the cutting upward to the top face side. On the other hand, a pair of concavities 15, which is to be engaged with the first engaging pieces 37, is formed at portions corresponding to the first engaging pieces 37 that is a cornered portion of the front face 10A and the bottom face 10C of the plug 10. Each concavity 15 has at least a wall face 15a, which is parallel to the rear face 10B, so that the wall face 15a contacts the first engaging piece 37 when the optical fibers 50A and 50B are pulled.

Figure 8:
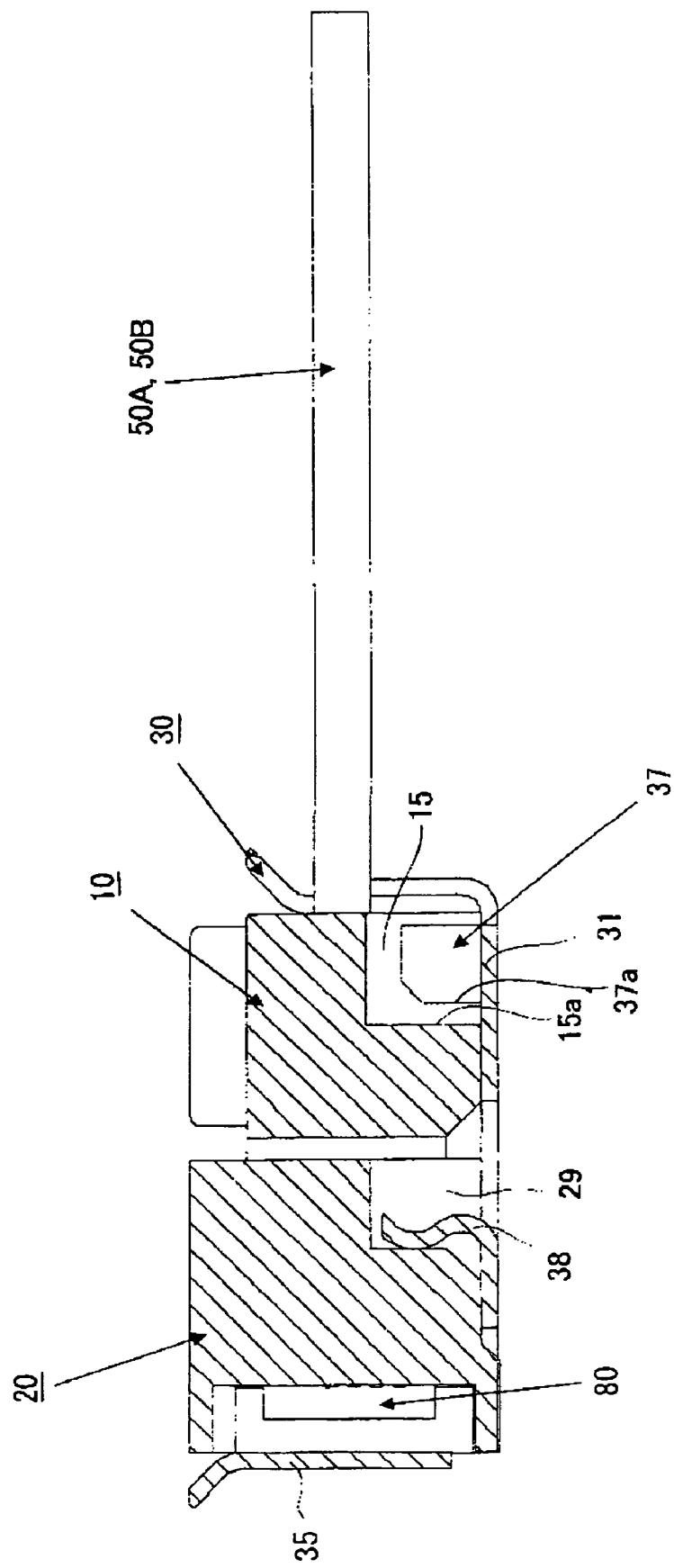
FIG. 8 is a sectional view showing a constitution for preventing of coming out of the plug in the first embodiment.

As shown in FIG. 8, the first engaging piece 37 provided on the bottom plate 31 of the shell 30 is fitted to the concavity 15 of the plug 10 in a state that the plug 10 is attached to the receptacle 40 (or the shell 30). Thereby, even when tensile force is applied to the optical fibers 50A and 50B, an end face 37a of the first engaging piece 37 will contact the wall face 15a of the concavity 15, so that coming out of the plug 10 is prevented. In addition, second engaging pieces 38 are provided at predetermined positions on the bottom plate 31 of the shell 30 for the MID 20, and concavities 29 are formed on the portions of the MID 20 corresponding to the second engaging pieces 38. Then, the MID 20 is fixed on the shell 30 with engaging the second engaging pieces 38 of the shell 30 with the concavities 29 of the MID 20.

When tensile force is applied to the optical fibers 50A and 50B, the plug 10 is going to move in a direction in which the force is applied, and the elastic piece 32 of shell 30 and so on are bent. However, the wall surface 15a of the concavity 15 of the plug 10 contacts the end face of the first engaging piece 37, so that the plug 10 cannot moved any more. Thus, the elastic piece 32 and so on may not be bent any more, too, and plastic deformation of the elastic piece 32 and so on is prevented. In addition, there is no mistake to put the plug 10 to the receptacle 40 upside down.

As mentioned above, the shell 30 is formed of a metal plate and soldering portions 36 protruded toward the sides from, for example, lower ends of the elastic pieces 33 and 34 will be soldered on GND lines of the circuit board which is not shown. Thereby, the receptacle 40 (or the shell 30) is implemented on the circuit board, and simultaneously the shell 30 is electrically connected to the GND lines. When the plug 10 is formed of a conductive plastic material, the plug 10 can be used as a part of shielding.

Figure 9:
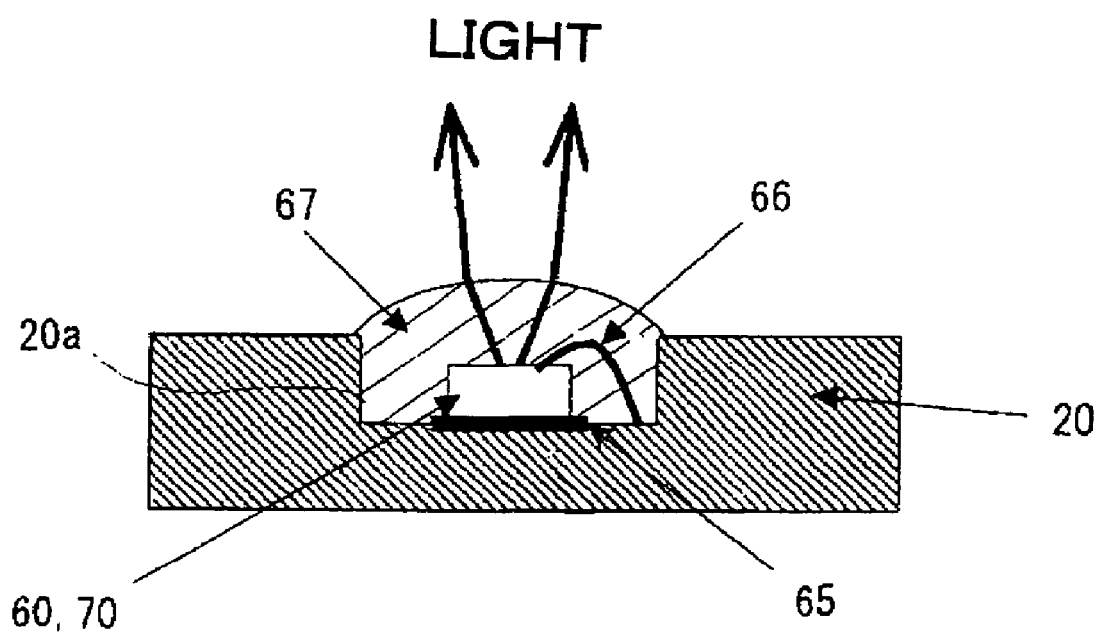
FIG. 9 is a sectional view showing a constitution that a light receiving device and a light emitting device are implemented on the MID in the first embodiment.

FIG. 9 shows an implementation structure of the light receiving device 60 and the light emitting device 70 in the MID 20. The light receiving device 60 and the light emitting device 70 are implemented in concavities 20a of the MID 20 and electrically connected to necessary circuits with using an Ag paste 65 and an Au wire 66. In addition, these elements are sealed with a resin 67. As shown in FIG. 1, the concavities 20a are formed on a front face 20A (the same face as the base ends 22a of the concave engaging portions 22) to concave toward a rear face 20B of MID 20.

Figure 10:
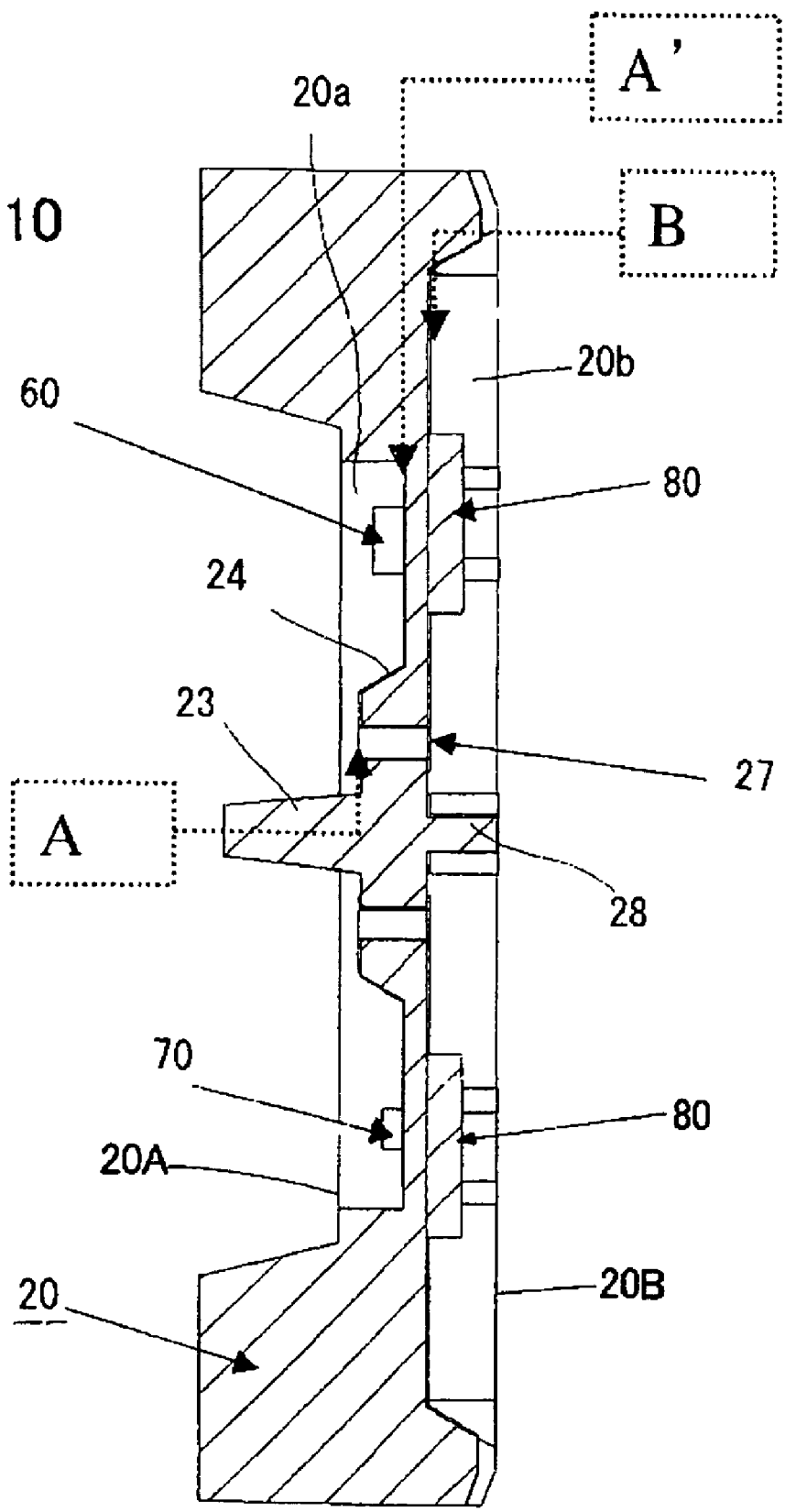
FIG. 10 is a sectional view showing a structure of a through hole of the MID in the first embodiment.
Figure 11:
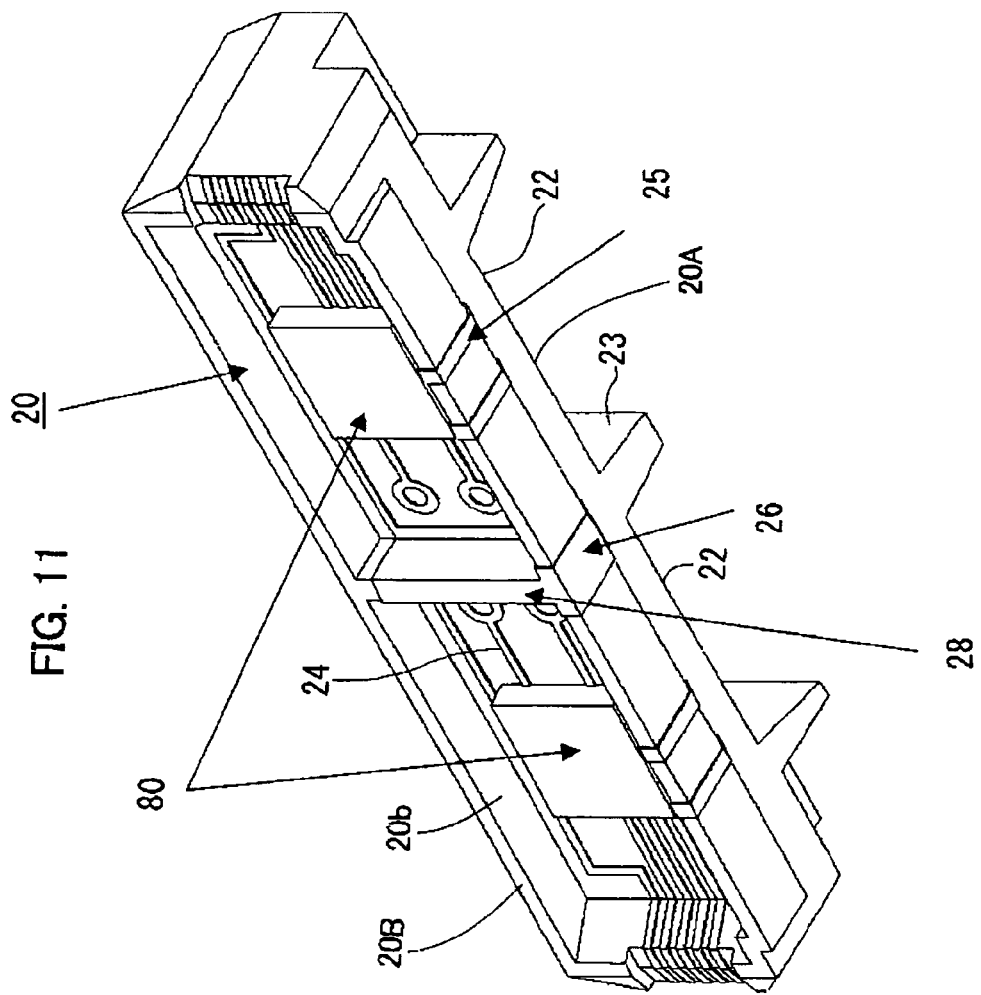
FIG. 11 is a perspective view showing a structure that an IC is implemented on the MID in the first embodiment.

FIG. 10 and FIG. 11 show a through-hole structure of the MID 20 and an implementation structure of an IC 80. Concavities 20b are formed on the rear face 20B of the MID 20, and two ICs 80 respectively for processing signals of the light receiving device 60 (second light receiving portion) and the light emitting device 70 (second light emitting portion) are implemented in the concavities 20b. A wiring pattern (designated by reference A) formed on the above front face 20A and a wiring pattern (designated by reference B) in the concavity 20b formed on the rear face 20B are connected through a through-hole wiring 27. In addition, a reference A' designates a bottom face of the concavity 20a in FIG. 10. These ICs 80 are sealed with a resin. A partition wall 28 is formed between the ICs 80 in the concavities 20b on the rear face 20B of the MID 20 for sealing the ICs 80 with the resin and for preventing interference of signals between the ICs 80. A grounded (GND) circuitry pattern (conductive pattern) is formed on surfaces of the partition wall 28. Thereby, interference of signals, that is, cross talk between the ICs 80 is prevented.

FIGS. 12A and 12B show wiring patterns on the bottom face of the MID 20. Soldering portions 25 for signal lines and soldering portions 26 for the GND, which are exposed from the shell 30 and to be soldered on the circuit board, are provided on the MID 20.

As described above, according to the photoelectric transforming connector for optical fibers in accordance with the first embodiment, the plug 10 can be connected to and held on the receptacle 40 from the top face thereof so as not to come out toward the top face, and the alignment of the optical axes of the plug 10 and the MID 20 in the heightwise direction of the receptacle 40 can be performed simultaneously. In addition, since the tapered faces 10D and 20D are used as connection portions of the convex engaging portions 12 of the plug 10 and the concave engaging portions 22 of the MID 20, and the alignment of the optical axes in the widthwise direction of the receptacle 40 is performed with the tapered faces 10D and 20D, miniaturization of the photoelectric transforming connector and improvement of workability of engagement are enabled.

Figure 13A:
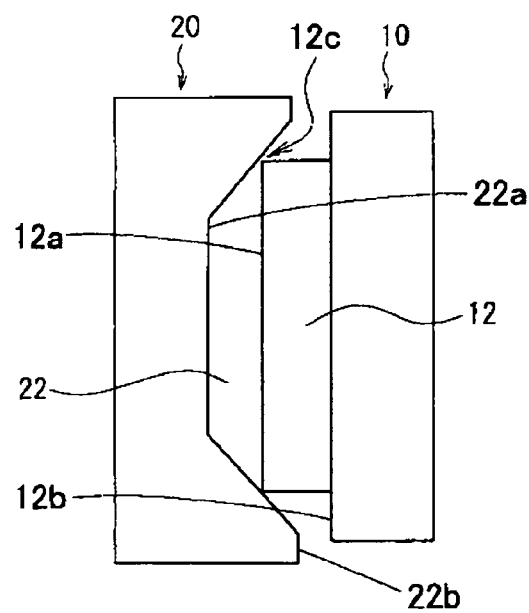
FIGS. 13A and 13B are views respectively showing modified examples of alignment of the plug and the MID with butting each other in the first embodiment, conceptually.
Figure 13B:
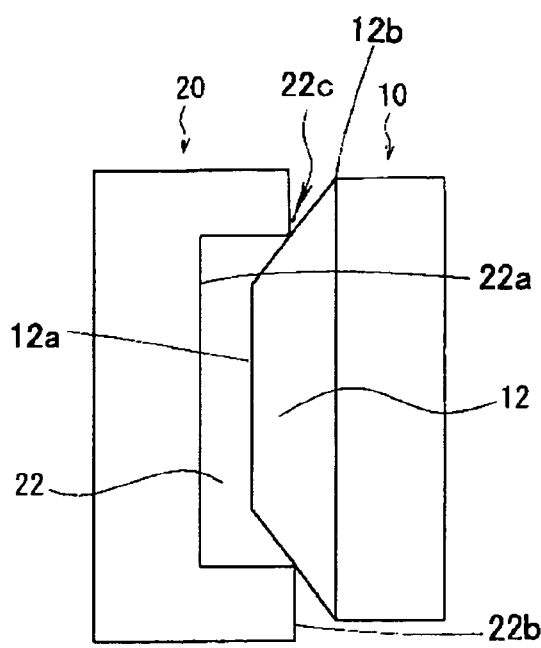
Figure 15:
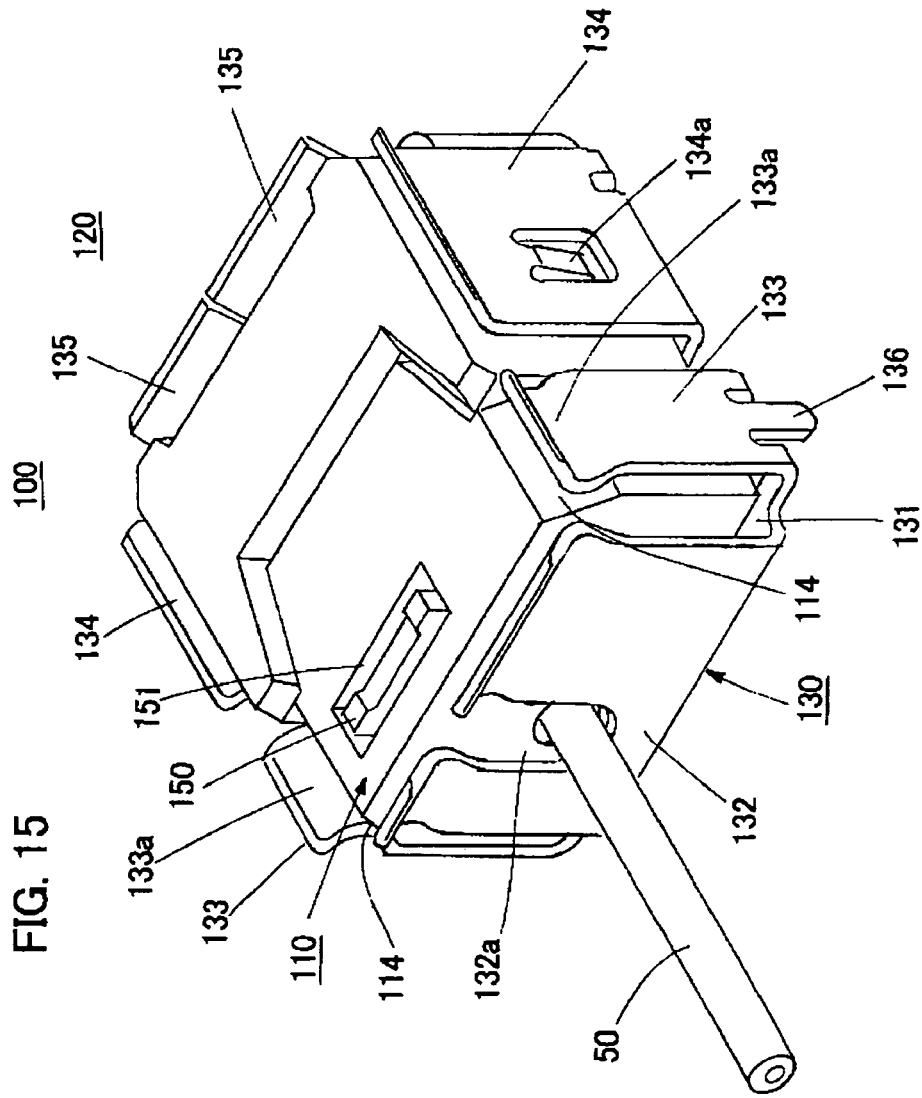
FIG. 15 is a perspective view showing a state after connecting the plug with the MID in the second embodiment.
Figure 17:
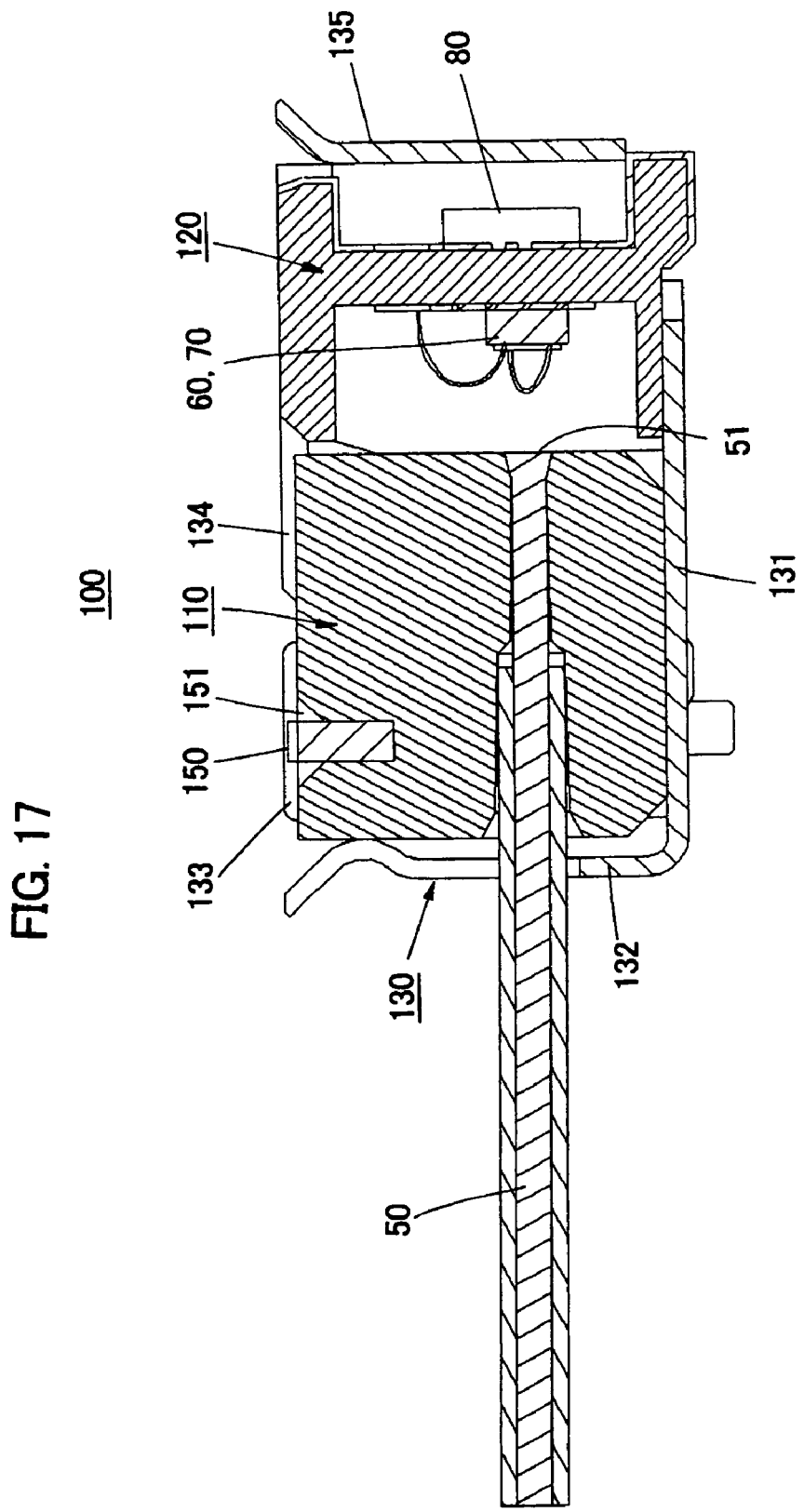
FIG. 17 is a sectional view showing a state that an optical fiber of the plug faces a light emitting device or a light receiving device of the MID in the second embodiment.

Furthermore, the present invention can be modified in various manners in a scope where the substance of the invention is not extended. For example, two modified examples with respect to the alignment of the plug 10 and the MID 20 are described with using FIGS. 13A and 13B. In the modified example shown in FIG. 13A, no tapered face is formed between the front end 12a and the base end 12b of the convex engaging portion 12 of the plug 10, and both corners 12c of the front end 12a of the convex engaging portion 12 contact the tapered faces between the base end 22a and the top end 22b of the concave engaging portion 22 of the MID 20. On the other hand, in the modified example shown in FIG. 13B, no tapered face is formed between the base end 22a and the top end 22b of the concave engaging portion 22 of the MID 20, and both corners 22c of the base end 22a of the concave engaging portion 22 contact the tapered faces between the front end 12a and the base end 12b of the convex engaging portion 12 of the plug 10. With such construction of the modified examples, since the contacting points of the convex engaging portion 12 of the plug 10 and the concave engaging portion 22 of the MID 20 decreases, it is sufficient that the accuracy of dimensions of the contacting points is secured.

Still furthermore, the present invention is not limited to the constitution of the above mentioned embodiments, and can be modified in various manners in a scope where the substance of the invention is not extended. For example, in the above embodiments, the convex engaging portions 12 are formed on the plug 10, and the concave engaging portions 22 are formed on the MID 20. Inversely, the concave engaging portions may be formed on the plug 10 and the convex engaging portions may be formed on the MID 20. Alternatively, a convex engaging portion and a concave engaging portion corresponding to the first light emitting portion and the first light receiving portion may be formed on the plug 10, and a concave engaging portion and a convex engaging portion corresponding to the second light emitting portion and the second light receiving portion may be formed on the MID 20, and vice versa.

Second Embodiment

A photoelectric transforming connector for optical fibers in accordance with a second embodiment of the present invention is described with reference to the drawings. The above mentioned first embodiment relates to the photoelectric transforming connector in which two optical fibers are connected to the plug so that the transmission and receiving of the light signals can be performed simultaneously. The second embodiment relates to a photoelectric transforming connector in which only one optical fiber is connected to the plug so that only the transmission or receiving of the light signal can be performed. Elements which are common in the first embodiment are designated by the same numeral, so that the descriptions of them are omitted.

Figure 18A:
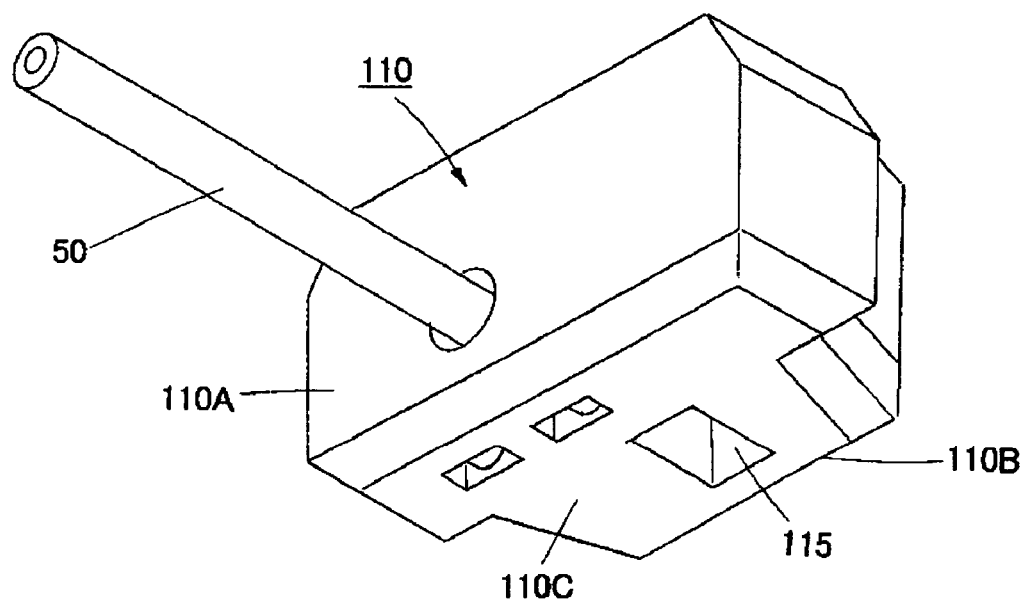
FIGS. 18A and 18B are perspective views of the plug in the second embodiment which are respectively observed from front bottom side and rear top side.
Figure 18B:
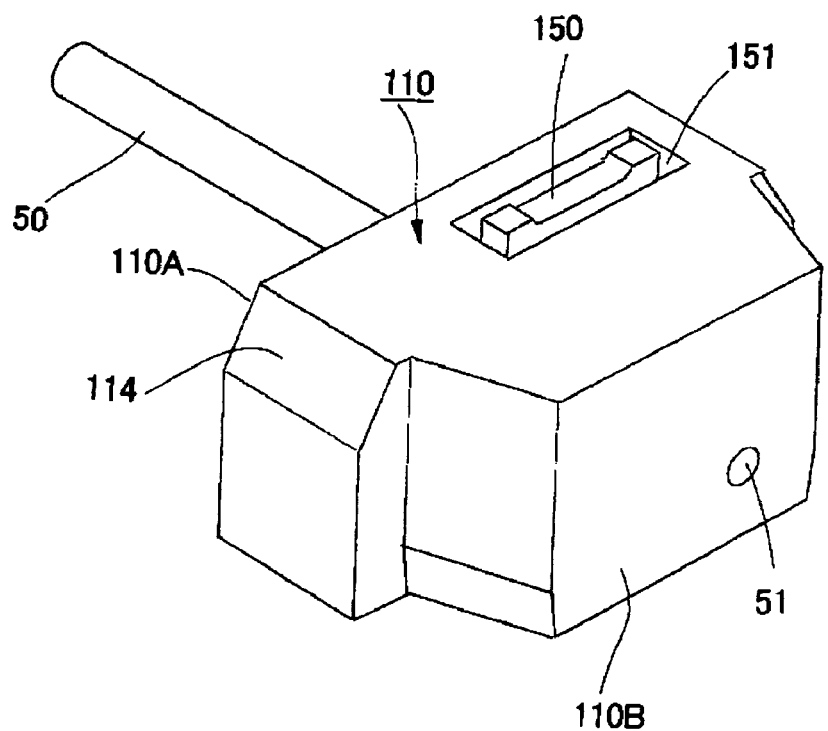
Figure 19A:
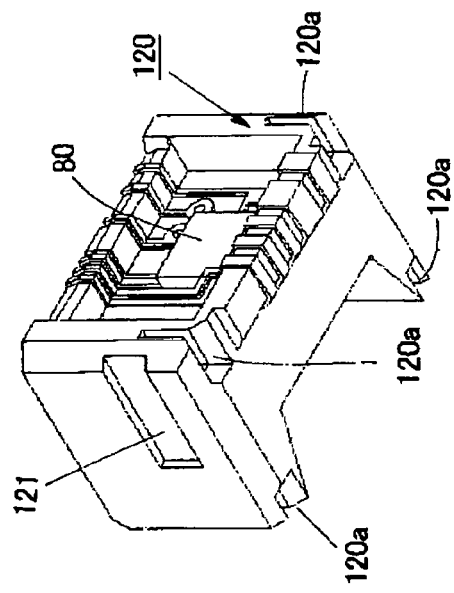
FIGS. 19A and 19B are perspective views of the MID in the second embodiment which are respectively observed from front bottom side and rear top side.
Figure 19C:
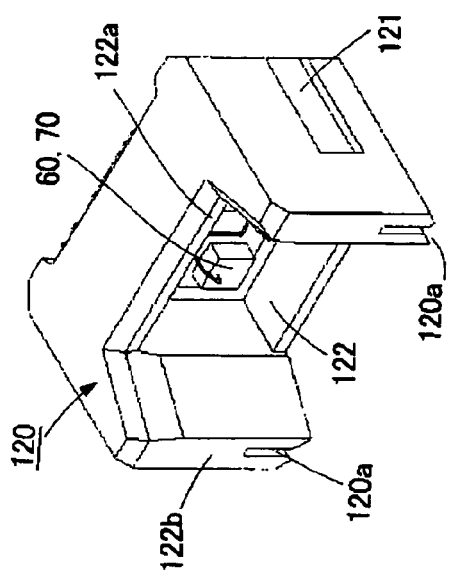
FIGS. 19C and 19D are respectively a front view and a rear view of the MID in the second embodiment.
Figure 19B:
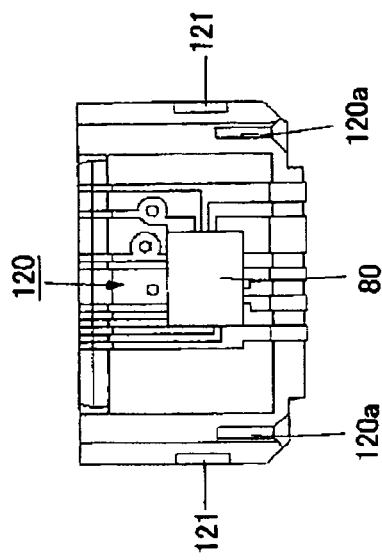
Figure 19D:
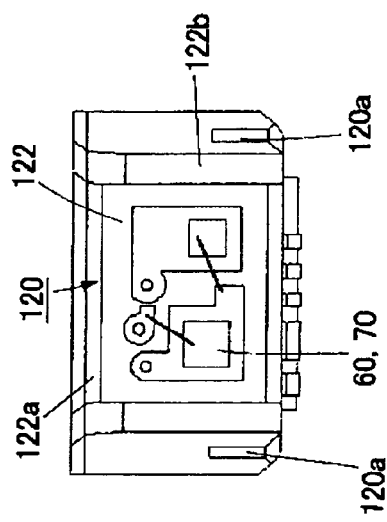
Figure 20:
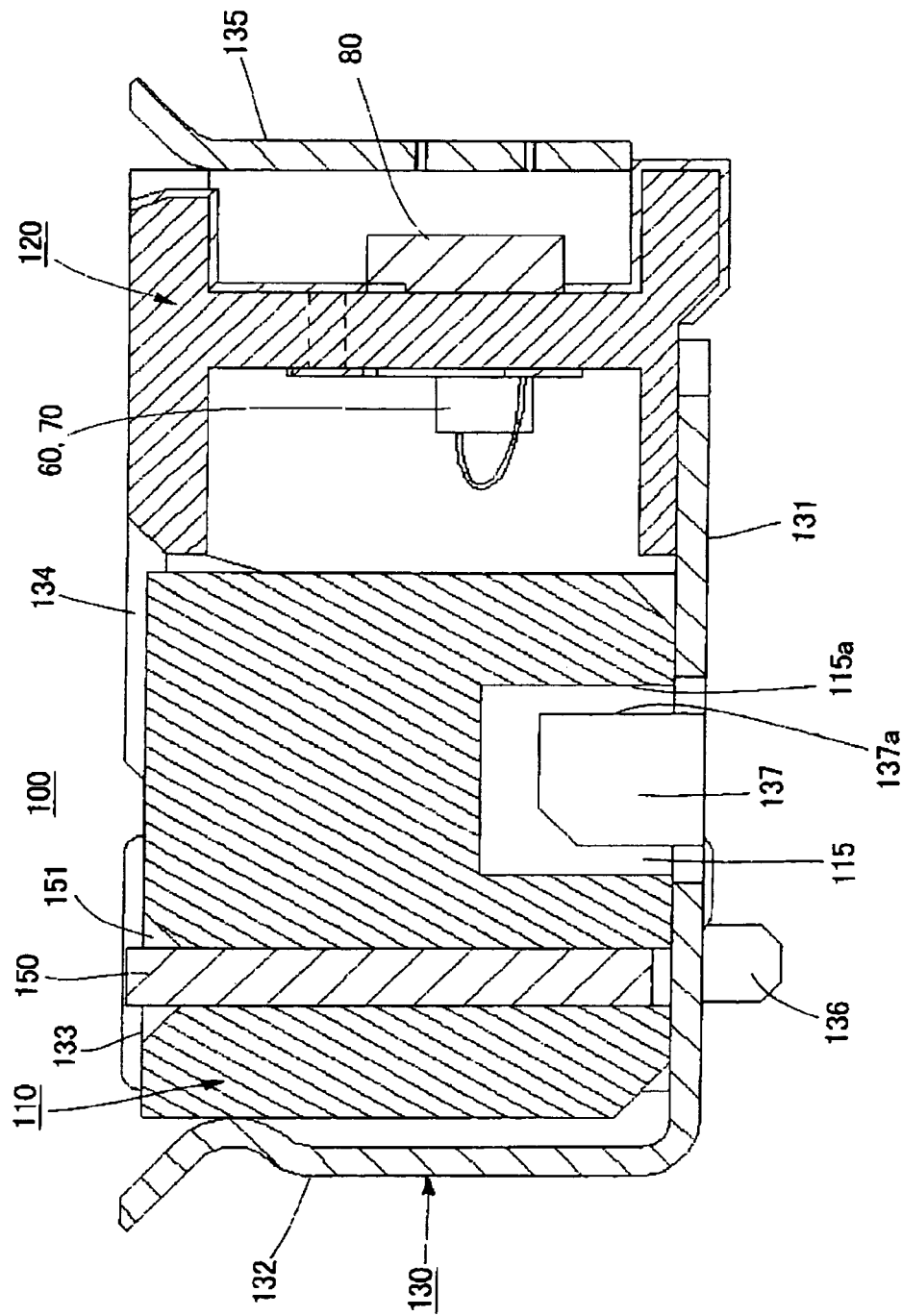
FIG. 20 is a sectional view showing a structure for preventing coming out of the plug the second embodiment.
Figure 21:
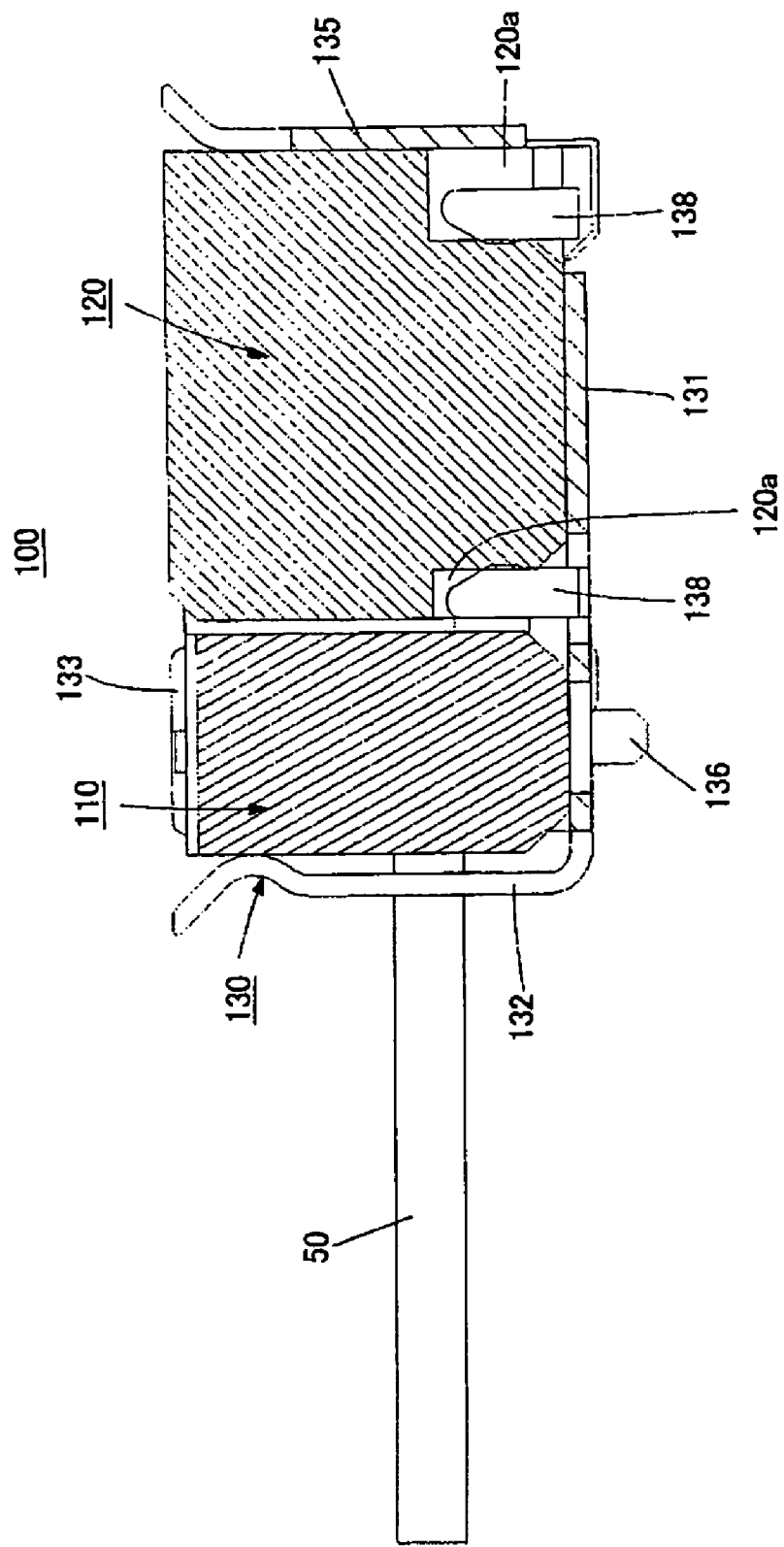
FIG. 21 is a sectional view showing a structure for aligning the MID with respect to a shell in opposing direction of them in the second embodiment.

FIG. 14 shows a state before connecting a plug 110 (first connection subject) to an MID (Molded Interconnect Device) 120 (second connection subject) comprising three-dimensional circuit board, which constitute the photoelectric transforming connector 100 in accordance with the second embodiment. FIG. 15, FIGS. 16A to 16E and FIG. 17 show the photoelectric transforming connector 100 after connecting the 110 and the MID 120. FIGS. 18A and 18B show the constitution of the plug 110. FIGS. 19A to 19D show the constitution of the MID 120. FIG. 20 shows an engaging structure of the plug 110 with a shell 130. FIG. 21 shows an engaging structure of the MID 120 with the shell 130.

In the photoelectric transforming connector 100 in accordance with the second embodiment, an optical fiber 50 is connected to the plug 110 so as to transmit or receive a light signal. The optical fiber 50 is formed of a plastic material to have flexibility, inserted into an optical fiber insertion hole 111 of the plug 110, and heat welded on the plug 110 similar to the case of the first embodiment. On the other hand, a light receiving device 60 or a light emitting device 70 and so on are implemented on a circuitry pattern 24 of the MID 120. The light receiving device 60 or the light emitting device 70 is provided at a position on the MID 120 facing an end face 51 of the optical fiber 50 in a state that the plug 110 and the MID 120 are connected.

When a signal is transmitted to another apparatus through the optical fiber 50, the end surface 51 of the optical fiber 50 serves as the first light emitting portion. In such a case, the MID 120, on which the light receiving device 60 serving as the second light receiving portion is provided at a position facing the end face 51 of the optical fiber 50 of the plug 110, is used. Alternatively, when a signal is transmitted from another apparatus through the optical fiver 50, the end surface 51 of the optical fiber 50 serves as the first light receiving portion. In such a case, the MID 120, on which the light emitting device 70 serving as the second light emitting portion is provided at a position facing the end face 51 of the optical fiber 50 of the plug 110, is used. (SIC)

The shell 130 has a bottom plate 131 on which the plug 110 and the MID 120 are placed under a state that the end face 51 of the optical fiber 50 (the first light emitting portion or the first light receiving portion) faces the light receiving device 60 (the second light receiving portion) or the light emitting device 70 (the second light emitting portion), and elastic pieces 132, 133, 134 and 135 which are formed to stand upward from four sides of the bottom plate 131 and contact or connected to side faces of the plug 110 and the MID 120. Two pairs of elastic pieces 133 and 134 are individually formed respectively corresponding to the plug 110 and the MID 120 on two parallel sides in a direction opposing the plug 110 and the MID 120 among four sides of the bottom plate 131 of the shell 130. In addition, a notch 132a to avoid interference with the optical fiber 50 is formed on the elastic piece 132 which contacts to a front face 110A of the plug 110.

In order to connect the plug 110 to the MID 120, similar to the case of the first embodiment, the plug 110 is attached to a receptacle 140, which is constituted by fixing the MID 120 on the shell 130, from top face of the receptacle 40 (longitudinal connection).

A hooking portion 133a, which is inwardly bent, is formed in a vicinity of a front end of each elastic piece 133 corresponding to the plug 110. The hooking portion 133a contacts to a slanted face 114 formed on the side face of the plug 110, so that it presses the plug 110 toward the bottom plate 131 of the shell 130. Therefore, it is prevented to come out the plug 110 improperly to a top face side of the receptacle 140 in a state that the plug 110 is attached to the receptacle 140.

On the other hand, an engaging portion 134a, which is inwardly bent along a substantially U-shaped cutting, is formed at a portion near to the center of each elastic piece 134 corresponding to the MID 120. As shown in FIGS. 19A to 19\* (SIC), engaging grooves 121 each engaging with the engaging portion 134a of the elastic piece 134 are formed on both sides of the MID 120. In a state that the MID 120 is attached to the shell 130, the engaging portions 134a of the elastic pieces 134 are engaged with the engaging grooves 121 of the MID 120. Therefore, when the plug 110 is attached to or detached from the receptacle 140, although the elastic pieces 133 corresponding to the plug 110 are deformed, the elastic pieces 134 corresponding to the MID 120 are not deformed, so that the MID 120 rarely moves in a heightwise direction of the photoelectric transforming connector 100. As a result, the attaching and detaching work of the plug 110 becomes easier. The alignment of the MID 120 with the plug 110 in the opposing direction will be described later.

A convex engaging portion 112 is formed on a face of the plug 110 facing the MID 120, and a concave engaging portion 122 is formed on a face of the MID 120 facing the plug 110. Since only the light receiving device 60 or the light emitting device 70 is implemented in the concave engaging portion 122 of the MID 120, no partition wall protruding toward the convex engaging portion 112 of the plug 110 is formed therein. In addition, no notch corresponding to the partition wall is formed on the convex engaging portion 112 of the plug 110.

As shown in FIG. 20, a first engaging piece 137 which protrudes toward top face side from the bottom plate 131 is provided on the shell 130 so as to prevent that the plug 110 leaves more than necessary from the MID 120 when the optical fiber 50 is pulled. The first engaging piece 137 is formed by cutting substantially the center portion of the bottom plate 131 in substantially U-shape in an opposing direction of the plug 110 and the MID 120 and a direction perpendicular thereto and by bending the portion along the cutting upward to the top face side. On the other hand, a concavity 115, which is to be engaged with the first engaging piece 137, is formed at a portion corresponding to the first engaging piece 137 on a bottom face 110C of the plug 110. The concavity 115 has at least a wall face 115a, which is parallel to the rear face 110B, so that the wall face 115a contacts the first engaging piece 37 when the optical fiber 50 is pulled.

In the with photoelectric transforming connector 100 in accordance with the second embodiment, a stopper 150 of the optical fiber 50 is provided to prevent that the optical fiber 50 is pulled out from the plug 110 when tensile force is applied to the optical fiber 50. Specifically, a concavity 115 having a rectangular cross-section is formed in a direction perpendicular to the optical fiber insertion hole 111 of the plug 110, and the stopper 150 is press fitted to an outer peripheral portion of the optical fiber 50 inside the concavity 151. Although it is not illustrated, a front end of the stopper 150 is further press fitted to the plug 110. Thus, the optical fiber 50 is unified with the plug 110 via the stopper 150, so that the optical fiber 50 may not be pulled out from the plug 110 unless fairly large force is applied thereto.

When tensile force is applied to the optical fiber 50, the plug 110 is going to move to a direction to which the force is applied, and thereby the elastic piece 132 of the shell 130 may be bent. However, the wall face 115a of the concavity 115 of the plug 110 contacts an end face of the first engaging piece 137, so that the plug 10 (SIC) may not be moved any more. Therefore, the elastic piece 132 cannot be bent any more, so that plastic deformation of the elastic piece 132 can be prevented. In addition, there is no mistake to put the plug 110 to the receptacle 140 upside down.

As shown in FIGS. 19A to 19D, four grooves 120a are formed at both ends of two corners formed between a front face 120A and a rear face 120B of the MID 120 with a bottom face 120C. Four of second engaging pieces 138 are formed at positions corresponding to the grooves 120a of the MID 120 on the bottom plate 131 of the shell 130 by cutting the bottom plate 131 in predetermined shapes and bending the portions upward along the cuttings. In a state that the MID 120 is attached to the shell 130, the second engaging pieces 138 of the shell 130 are engaged with the grooves 120a of the MID 120, and thereby, the movement of the MID 120 against the shell 130 in the opposing direction of the plug 110 and the MID 120 is restricted. As shown in FIG. 21, minute protrusions may be formed on the second engaging pieces 138 so as to be press fitted to the MID 120.

The shell 130 is formed of a metal plate, and, for example, soldering portions 136 protruded downward from lower ends of the elastic pieces 33 (SIC) are soldered to GND lines on a circuit board which is not shown. Thereby, the receptacle 140 (or the shell 130) is implemented on the circuit board, and simultaneously, the shell 130 is electrically connected to the GND line. When the plug 110 is formed of a conductive plastic material, the plug 110 itself can be used as a part of a shielding.

In this way, according to the second embodiment, advantageous merits the same as those of the above mentioned first embodiment can be provided. In addition, it is needless to say that various modifications may be performed similar to the first embodiment.

The photoelectric transforming connector for optical fibers is not limited to the above mentioned embodiment, and it is sufficient that it comprises: at least a first connection subject to which an optical fiber is connected and having a first light emitting portion transmitting a light signal and/or a first light receiving portion receiving a light signal through the optical fiber; a second connection subject having a second light receiving portion facing the first light emitting portion and converting a light signal to an electric signal and/or a second light emitting portion facing the first light receiving portion, converting an electric signal to a light signal and transmitting it to the first light receiving portion; and a shell to which the first connection subject and the second connection subject are attached. It is sufficient that the shell has a bottom plate to which the first connection subject and the second connection subject are attached so that the first light emitting portion faces the second light receiving portion and/or the first light receiving portion faces the second light emitting portion, and a plurality of elastic pieces provided to stand upward on four sides of the bottom plate and contacting with the first connection subject and the second contacting subject.

Thereby, under a state that the second connection subject (equivalent to a socket) is attached to the shell, the first connection subject (equivalent to a plug) and the second connection subject can be aligned contiguously by attaching the first connection subject in a direction perpendicular to the bottom plate of the shell. Therefore, works for attaching and detaching the first connection subject becomes easier, and this photoelectric transforming connector can be incorporated in an electronic apparatus without upsizing the height of the electronic apparatus. In addition, when this photoelectric transforming connector is implemented on a circuit board, the first connection subject can be attached and detached in a direction perpendicular to the bottom plate of the shell, so that a possibility to interfere with other electronic components on the circuit board becomes very few. Thus, a space, which enables the works for attaching and detaching the first connection subject easier, can be miniaturized, and thereby upsizing of the circuit board is prevented. As a result, the photoelectric transforming connector can be applied to miniaturized mobile apparatus.

Furthermore, it is preferable that two elastic pieces are individually formed corresponding to the first connection subject and the second connection subject on each of two sides among four side of the bottom plate, which are parallel to an opposing direction of the first connection subject and the second connection subject. Thereby, when the first connection subject is attached to or detached from the shell under a state that the second connection subject is attached to the shell, the second connection subject is rarely moved, so that the attaching and detaching work of the first connection subject becomes easier.

Still furthermore, it is preferable that an engaging portion, which is inwardly bent, is formed in a vicinity of a front end of at least an elastic piece corresponding to the first connection subject among two elastic pieces respectively provided on each of two sides of the bottom plate parallel to the opposing direction of the first connection subject and the second connection subject, and a slanted face pressed toward the bottom plate of the shell with the engaging portion is formed on each side face of the first connection subject. Thereby, it is possible to prevent the coming out of the first connection subject to top face side, and to align optical axes easily in heightwise direction of the photoelectric transforming connector.

Still furthermore, it is preferable that a convex engaging portion and a concave engaging portion are formed on opposing faces of the first connection subject and the second connection subject; a front end and a base end of the convex engaging portion are not contact with a base end and a front end of the concave engaging portion in a state that the first connection subject and the second connection subject are connected; and front ends of at least one of the convex engaging portion and the concave engaging portion are formed so that edges of both sides of them in a direction perpendicular to the opposing direction of the first connection subject and the second connection subject contact with at least another of the convex engaging portion and the concave engaging portion. Thereby, a number of contacting points is reduced, so that sufficient engaging accuracy of the first connection subject and the second connection subject can be obtained when the dimension accuracy of the contacting points is ensured. Thus, the first connection subject and the second connection subject can easily be manufactured, since they need the dimension accuracy not too high in comparison with a constitution that the first connection subject and the second connection subject are entirely contacted. In addition, the alignment of optical axes in widthwise direction and in the opposing direction of the first connection subject and the second connection subject can easily be performed.

Still furthermore, it is preferable that tapered faces are respectively formed between a front end and a base end of the convex engaging portion and between a front end and a base end of the concave engaging portion so as to contact the tapered face of the convex engaging portion to the tapered face of the concave engaging portion. Thereby, it is easily confirmed that the tapered faces of the convex engaging portion and the concave engaging portion, so that the alignment of the first connection subject and the second connection subject can be performed easily, and the optical axes of them may hardly be discrepant.

Still furthermore, it is preferable that an engaging piece protruding toward top face side is provided on the bottom plate; the optical fiber is connected to the first connection subject from a face opposite to the face having the first light emitting portion and the first light receiving portion, a concavity which is engaged with the engaging piece is formed at a portion corresponding to the engaging piece on a face of the first connection subject facing the bottom plate of the shell; and the concavity has at least a wall face parallel to the face having the first light emitting portion and the first light receiving portion. Thereby, when tensile force is applied to the optical fiber, although the elastic piece is bent in some degree, the engaging piece contacts with the wall face of the concavity, so that the elastic piece may not be bent any more. As a result, plastic deformation of the elastic piece can be prevented. In addition, it is possible to prevent the first connection subject is attached upside down to the shell.

Still furthermore, it is preferable that the engaging piece is formed by cutting the bottom plate of the shell in a direction parallel to the opposing direction of the first connection subject and the second connection subject and a direction perpendicular thereto and bending a portion along the cuttings toward top face side. Thereby, when tensile force is applied to the optical fiber and the engaging piece contacts the wall of the concavity, the engaging piece becomes hard to fall down, so that deformation of the engaging piece can be prevented.

Still furthermore, it is preferable that the first connection subject is made of a conductive plastic material and the shell is made of a metal, and the shell is grounded. By connecting the shell to a GND of a circuit board, the first connection subject itself can be used as a part of a shielding.

Still furthermore, it is preferable that the first light emitting portion and the first light receiving portion are provided in parallel with each other on the face of the first connection subject facing the second connection subject; and the second light emitting portion and the second light receiving portion are provided in parallel with each other on the face of the second connection subject facing the first connection subject respectively for facing the first light emitting portion and the first light receiving portion. Thereby, transmission and receiving of light signals can be performed simultaneously with one photoelectric transforming connector without upsizing the dimension in heightwise direction of the photoelectric transforming connector.

Still furthermore, it is preferable that the convex engaging portion is formed on the first connection subject, and the concave engaging portion is formed on the second connection subject; the second light emitting portion and the second light receiving portions are respectively provided in the concave engaging portion; a partition wall protruding toward the convex engaging portion is formed between the second light emitting portion and the light receiving portion in the concave engaging portion; and a notch to which the partition wall is engaged is formed at a portion of the convex engaging portion corresponding to the partition wall. In this way, with providing the partition wall, it is prevented that light from the first light emitting portion enters into the second receiving emitting portion, or light from the second light emitting portion enters into the first light receiving portion, so that interference of light signals can be prevented.

Still furthermore, it is preferable that two ICs for processing signals of the second light emitting portion and the second light receiving portion are implemented on a face opposite to the face having the second light emitting portion and the second light receiving portion of the second connection subject; and a partition wall having a conductive pattern to be grounded and preventing the interference of signals between the ICs is formed between the two ICs. Thereby, cross talk of signals between two ICs can be prevented.

This application is based on Japan Patent Application No. 2005-22818, and the contents of which are hereby incorporated by references of the specification and drawings of the patent application.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

The invention claimed is:

1. A photoelectric transforming connector for optical fibers, comprising:
   a first connection subject to which an optical fiber is connected and having a first light emitting portion that transmits a light signal and/or a first light that receives portion receiving a light signal through the optical fiber;
   a second connection subject having a second light receiving portion facing the first light emitting portion that converts a light signal to an electric signal and/or a second light emitting portion facing the first light receiving portion, converting an electric signal to a light signal and transmitting it to the first light receiving portion; and
   a shell to which the first connection subject and the second connection subject are attached, wherein
   the shell has a bottom plate to which the first connection subject and the second connection subject are attached so that the first light emitting portion faces the second light receiving portion and/or the first light receiving portion faces the second light emitting portion, and a plurality of elastic pieces provided to stand upward on four sides of the bottom plate and contacting with the first connection subject and the second contacting subject,
   a convex engaging portion and a concave engaging portion formed on opposing faces of the first connection subject and the second connection subject;
   a front end and a base end of the convex engaging portion not contacting a base end and a front end of the concave engaging portion in a state that the first connection subject and the second connection subject are connected, and
   front ends of at least one of the convex engaging portion and the concave engaging portion are formed so that edges in a direction perpendicular to an opposing direction of the first connection subject and the second connection subject contact to at least another of the convex engaging portion and the concave engaging portion.

2. The photoelectric transforming connector of claim 1, wherein
   two elastic pieces are individually formed corresponding to the first connection subject and the second connection subject on each of two sides among four sides of the bottom plate, which are parallel to an opposing direction of the first connection subject and the second connection subject.

3. The photoelectric transforming connector of claim 2, wherein
   an engaging portion, which is inwardly bent, is formed in a vicinity of a front end of at least an elastic piece corresponding to the first connection subject among two elastic pieces respectively provided on each of two sides of the bottom plate parallel to the opposing direction of the first connection subject and the second connection subject, and a slanted face presses toward the bottom plate of the shell with the engaging portion formed on each side face of the first connection subject.

4. The photoelectric transforming connector of claim 1, wherein
   tapered faces are respectively formed between a front end and a base end of the convex engaging portion and between a front end and a base end of the concave engaging portion, so as to contact the tapered face of the convex engaging portion to the tapered face of the concave engaging portion.

5. The photoelectric transforming connector of claim 1, wherein
   the first connection subject is made of a conductive plastic material and the shell is made of a metal, and the shell is grounded.

6. The photoelectric transforming connector of claim 1, wherein
   the first light emitting portion and the first light receiving portion are provided parallel with each other on the face of the first connection subject facing the second connection subject, and
   the second light emitting portion and the second light receiving portion are provided parallel with each other on the face of the second connection subject facing the first connection subject respectively for facing the first light emitting portion and the first light receiving portion.

7. The photoelectric transforming connector of claim 6, wherein
   a convex engaging portion is formed on the first connection subject, and a concave engaging portion is formed on the second connection subject,
   the second light emitting portion and the second light receiving portions are respectively provided in the concave engaging portion,
   a partition wall protruding toward the convex engaging portion is formed between the second light emitting portion and the light receiving portion in the concave engaging portion, and
   a notch, to which the partition wall is engaged, is formed at a portion of the convex engaging portion corresponding to the partition wall.

8. The photoelectric transforming connector of claim 6, wherein
   two ICs for processing signals of the second light emitting portion and the second light receiving portion are implemented on a face opposite to the face having the second light emitting portion and the second light receiving portion of the second connection subject, and
   a partition wall having a conductive pattern to be grounded and preventing the interference of signals between the ICs is formed between the two ICs.

9. A photoelectric transforming connector for optical fibers comprising:
   a first connection subject to which an optical fiber is connected and having a first light emitting portion that transmits a light signal and/or a first light receiving portion that receives a light signal through the optical fiber;
   a second connection subject having a second light receiving portion facing the first light emitting portion that converts a light signal to an electric signal and/or a second light emitting portion facing the first light receiving portion, converting an electric signal to a light signal and transmitting it to the first light receiving portion; and a shell to which the first connection subject and the second connection subject are attached, wherein the shell has a bottom plate to which the first connection subject and the second connection subject are attached so that the first light emitting portion faces the second light receiving portion and/or the first light receiving portion faces the second light emitting portion, and a plurality of elastic pieces provided to stand upward on four sides of the bottom plate and contacting with the first connection subject and the second contacting subject, an engaging piece protruding toward a top face side is provided on the bottom plate, the optical fiber is connected to the first connection subject from a face opposite to the face having the first light emitting portion and the first light receiving portion, a concavity engaging with the engaging piece formed at a portion corresponding to the engaging piece on a face of the first connection subject facing the bottom plate of the shell, and the concavity has at least a wall face parallel to the face having the first light emitting portion and the first light receiving portion.

10. The photoelectric transforming connector of claim 9, wherein the engaging piece is formed by cutting the bottom plate of the shell in a direction parallel to the opposing direction of the first connection subject and the second connection subject and a direction perpendicular to the engaging piece and bending a portion along the cutting toward the top face side.

11. The photoelectric transforming connector of claim 9, wherein the first connection subject is made of a conductive plastic material and the shell is made of a metal, and the shell is grounded.

12. The photoelectric transforming connector of claim 9, wherein the first light emitting portion and the first light receiving portion are provided parallel with each other on the face of the first connection subject facing the second connection subject, and the second light emitting portion and the second light receiving portion are provided parallel with each other on the face of the second connection subject facing the first connection subject respectively for facing the first light emitting portion and the first light receiving portion.

13. The photoelectric transforming connector of claim 12, wherein a convex engaging portion is formed on the first connection subject, and a concave engaging portion is formed on the second connection subject, the second light emitting portion and the second light receiving portions are respectively provided in the concave engaging portion, a partition wall protruding toward the convex engaging portion is formed between the second light emitting portion and the light receiving portion in the concave engaging portion, and a notch, to which the partition wall is engaged, is formed at a portion of the convex engaging portion corresponding to the partition wall.

14. The photoelectric transforming connector of claim 12, wherein two ICs for processing signals of the second light emitting portion and the second light receiving portion are implemented on a face opposite to the face having the second light emitting portion and the second light receiving portion of the second connection subject, and a partition wall having a conductive pattern to be grounded and preventing the interference of signals between the ICs is formed between the two ICs.

* * * * *